US011645389B2

(12) United States Patent
Tseng et al.

(10) Patent No.: US 11,645,389 B2
(45) Date of Patent: May 9, 2023

(54) OPTIMIZED EXECUTION OF FRAUD DETECTION RULES

(71) Applicant: MASTERCARD TECHNOLOGIES CANADA ULC, Vancouver (CA)

(72) Inventors: Yi Wei Tseng, Vancouver (CA); Randy Lukashuk, Errington (CA); Perry McGee, Vancouver (CA); Amiran Gigiberia, Coquitlam (CA); Andrew Giblin, Burnaby (CA); Kenny Wan, Burnaby (CA); Andrian Sevastyanov, Burnaby (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 25 days.

(21) Appl. No.: 16/567,148

(22) Filed: Sep. 11, 2019

(65) Prior Publication Data

US 2020/0082413 A1 Mar. 12, 2020

Related U.S. Application Data

(60) Provisional application No. 62/729,492, filed on Sep. 11, 2018.

(51) Int. Cl.
*G06F 21/55* (2013.01)
*G06F 8/51* (2018.01)
(Continued)

(52) U.S. Cl.
CPC .............. *G06F 21/564* (2013.01); *G06F 8/51* (2013.01); *G06F 21/554* (2013.01); *G06F 21/561* (2013.01); *G06Q 30/0185* (2013.01)

(58) Field of Classification Search
None
See application file for complete search history.

(56) References Cited

U.S. PATENT DOCUMENTS 7,386,105 B2 6/2008 Wasserblat et al.
7,433,855 B2 10/2008 Gavan et al.
(Continued)

FOREIGN PATENT DOCUMENTS

WO 2004104780 A2 12/2004
WO 2018226895 A2 12/2018

OTHER PUBLICATIONS

Kulkarni; Transpilerand it's Advantages; 2015; IJCSIT; vol. 6 (2).*
(Continued)

*Primary Examiner* — Dennis W Ruhl
*Assistant Examiner* — Donald J Edmonds
(74) *Attorney, Agent, or Firm* — Michael Best & Friedrich LLP

(57) ABSTRACT

Systems, methods, devices, and computer readable media related to fraud detection. Fraud detection is achieved using a flexible scripting language and syntax that simplifies the generation of fraud detection rules. The rules are structured as conditional IF-THEN statements that include data objects referred to as Anchors and Add-Ons. The Anchors and Add-Ons used to generate the rules also correspond to a distinct data path for the retrieval data from any of a variety of data sources. The retrieval of data from the various data sources is optimized based on data dependencies within the rules. By knowing the data dependencies of each rule and utilizing parallelization of rule execution, the retrievals of data from the data sources is achieved efficiently so the rules can be executed quickly.

21 Claims, 14 Drawing Sheets

(51) Int. Cl.
*G06Q 30/00* (2012.01)
*G06F 21/56* (2013.01)
*G06Q 30/018* (2023.01)

(56) References Cited

U.S. PATENT DOCUMENTS

| | | |
|---|---|---|
| 8,862,551 B2 | 10/2014 | Lim |
| 9,690,937 B1* | 6/2017 | Duchin ............... G06F 21/562 |
| 10,776,790 B2 | 9/2020 | Nandy |
| 2007/0106580 A1 | 5/2007 | Yang et al. |
| 2007/0239604 A1* | 10/2007 | O'Connell ......... G06Q 20/4016 705/50 |
| 2008/0046334 A1* | 2/2008 | Lee .................... G06Q 20/4016 705/318 |
| 2009/0129573 A1 | 5/2009 | Gavan et al. |
| 2009/0313613 A1 | 12/2009 | Ben-Artzi et al. |
| 2010/0145836 A1* | 6/2010 | Baker .................. G06Q 40/08 705/30 |
| 2010/0305993 A1* | 12/2010 | Fisher ................ G06Q 20/4016 706/47 |
| 2012/0158585 A1* | 6/2012 | Ganti ................. G06Q 20/4016 705/44 |
| 2012/0159632 A1 | 6/2012 | Barriga et al. |
| 2014/0181897 A1 | 6/2014 | Zaitsev |
| 2014/0282856 A1 | 9/2014 | Duke et al. |
| 2015/0020084 A1* | 1/2015 | Pierson ................ G06F 9/4484 719/328 |
| 2015/0026027 A1* | 1/2015 | Priess ................ G06Q 20/4016 705/35 |
| 2015/0039513 A1* | 2/2015 | Adjaoute ............ H04L 63/1425 705/44 |
| 2015/0134512 A1* | 5/2015 | Mueller ............. G06Q 20/4016 705/39 |
| 2015/0154601 A1* | 6/2015 | Nandy .................. G06N 5/025 705/44 |
| 2015/0186901 A1* | 7/2015 | Miltonberger ..... G06Q 20/4016 705/318 |
| 2016/0099963 A1 | 4/2016 | Mahaffey et al. |
| 2016/0247158 A1 | 8/2016 | Kolotinsky |
| 2016/0335551 A1 | 11/2016 | Droll et al. |
| 2017/0069003 A1* | 3/2017 | Barta ................. G06Q 30/0185 |
| 2017/0221075 A1* | 8/2017 | Wang .................... G06N 5/003 |
| 2017/0257385 A1 | 9/2017 | Overson et al. |
| 2020/0394050 A1 | 12/2020 | Schultheiss et al. |

OTHER PUBLICATIONS

International Search Report and Written Opinion for Application No. PCT/CA2019/051278 dated Dec. 19, 2019 (10 pages).
International Search Report and Written Opinion for Application No. PCT/CA2019/051282 dated Nov. 26, 2019 (8 pages).
European Patent Office Extended Search Report for Application No. 19859237.0 dated Apr. 29, 2022 (8 pages).
European Patent Office Extended Search Report for Application No. 19859951.6 dated May 31, 2022 (5 pages).

* cited by examiner

OPTIMIZED EXECUTION OF FRAUD DETECTION RULES

RELATED APPLICATIONS

This application claims the benefit of U.S. Provisional Patent Application No. 62/729,492, filed Sep. 11, 2018, the entire content of which is hereby incorporated by reference.

FIELD

Embodiments described herein relate to the detection of fraudulent activity on a website or mobile platform.

BACKGROUND

Detecting fraudulent web-based activity can be a difficult task. As fraudulent or malicious attacks become more and more sophisticated, more sophisticated and efficient techniques for detecting the fraudulent activity are desired. However, there are a number of difficulties associated with fraud detection in a web-based environment. Whether working with a website or through a mobile-platform, fraud detection is being performed in a time-constrained application environment. Accurate fraud detection, however, requires the execution of a large and/or complex set of rules in that time-constrained application environment.

SUMMARY

Embodiments described herein provide systems, methods, devices, and computer readable media related to fraud detection. Fraud detection is achieved using a flexible scripting language and syntax that simplifies the generation of fraud detection rules. The scripting language is structured such that millions or even billions of potential rules (and/or portions thereof) can be generated based on data queries from a variety of data sources. The rules are structured as conditional IF-THEN statements that include data objects referred to as Anchors and Add-Ons.

In embodiments, the generated fraud detection rules rely upon the retrieval and evaluation of a variety of data points corresponding to the Anchors and Add-Ons which, for example, can number into the tens of thousands. The rules employ precomputed or predetermined data paths that allow a fraud detection system to quickly and efficiently retrieve data from the various data sources. For example, the system parses all of the fraud detection rules to determine data dependencies for each rule. Based on the data dependencies, the system is able to leverage parallelization of rule execution and re-use of retrieved data where possible or desirable. Compiled fraud detection rules with optimized data paths are then converted from the flexible scripting language into native language code (e.g., PHP: Hypertext Preprocessor, Java, etc.) for deployment in a particular environment. With the fraud detection rules being executed in the native language code for the particular environment, the fastest possible execution of the fraud detection rules can be achieved. In some embodiments, the system is able to execute thousands of rules in only approximately 100-300 milliseconds.

Embodiments described herein provide a fraud detection system that includes a database and a server. The server is connected to the database. The server is configured to execute a first fraud detection rule and a second fraud detection rule. The first fraud detection rule and the second fraud detection rule are stored in the database. The server includes a processing unit and a memory. The server is configured to receive a request for a fraud risk determination from a client. The request is associated with a requested action. The server is also configured to retrieve the first fraud detection rule from the database. The first fraud detection rule includes a first Anchor attribute and a first Add-On identifier. The first Anchor attribute and the first Add-On identifier correspond to a first data path for retrieval of a first value related to the first Add-On identifier. The server is also configured to retrieve the second fraud detection rule from the database. The second fraud detection rule includes a second Anchor attribute and a second Add-On identifier. The second Anchor attribute and the second Add-On identifier correspond to a second data path for retrieval of a second value related to the second Add-On identifier. The second value is dependent on the first value. The server is also configured to retrieve the first value using the first data path. Retrieval of the first value using the first data path is prioritized over retrieval of the second value using the second data path. The server is also configured to execute the first fraud detection rule, retrieve the second value using the second data path and based on the dependency on the first value, execute the second fraud detection rule, generate a fraud risk score related to the requested action based on the executed first fraud detection rule and the executed second fraud detection rule, and transmit the fraud risk score to the client to cause permission or denial of the requested action.

Embodiments described herein provide a computer-implemented fraud detection method. The method includes receiving a request for a fraud risk determination from a client. The request is associated with a requested action. The method also includes retrieving a first fraud detection rule from a database. The first fraud detection rule includes a first Anchor attribute and a first Add-On identifier. The first Anchor attribute and the first Add-On identifier correspond to a first data path for retrieving a first value related to the first Add-On identifier. The method also includes retrieving a second fraud detection rule from the database. The second fraud detection rule includes a second Anchor attribute and a second Add-On identifier. The second Anchor attribute and the second Add-On identifier correspond to a second data path for retrieving a second value related to the second Add-On identifier. The second value is dependent on the first value. The method also includes retrieving the first value using the first data path. Retrieving the first value using the first data path is prioritized over retrieving the second value using the second data path. The method also includes executing the first fraud detection rule, retrieving the second value using the second data path and based on the dependency on the first value, executing the second fraud detection rule, generating a fraud risk score related to the requested action based on the executing of the first fraud detection rule and the second fraud detection rule, and transmitting the fraud risk score to the client to cause permission or denial of the requested action.

Embodiments described herein provide a non-transitory computer readable medium. The non-transitory computer readable medium includes computer executable instructions stored in the computer readable medium for controlling a device to receive a request for a fraud risk determination from a client. The request is associated with a requested action. The computer executable instructions stored in the computer readable medium are also for controlling the device to retrieve a first fraud detection rule from a database. The first fraud detection rule includes a first Anchor attribute and a first Add-On identifier. The first Anchor attribute and the first Add-On identifier correspond to a first data path for retrieval of a first value related to the first Add-On identifier.

The computer executable instructions stored in the computer readable medium are also for controlling the device to retrieve a second fraud detection rule from the database. The second fraud detection rule includes a second Anchor attribute and a second Add-On identifier. The second Anchor attribute and the second Add-On identifier correspond to a second data path for retrieval of a second value related to the second Add-On identifier. The second value is dependent on the first value. The computer executable instructions stored in the computer readable medium are also for controlling the device to retrieve the first value using the first data path. Retrieval of the first value using the first data path is prioritized over retrieval of the second value using the second data path. The computer executable instructions stored in the computer readable medium are also for controlling the device to execute the first fraud detection rule, retrieve the second value using the second data path and based on the dependency on the first value, execute the second fraud detection rule, generate a fraud risk score related to the requested action based on the executed first fraud detection rule and the executed second fraud detection rule, and transmit the fraud risk score to the client to cause permission or denial of the requested action.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components. Similarly, aspects herein that are described as implemented in software can, as recognized by one of ordinary skill in the art, be implemented in various forms of hardware.

Other aspects of the embodiments will become apparent by consideration of the detailed description and accompanying drawings.

DETAILED DESCRIPTION

Embodiments described herein provide systems, methods, devices, and computer readable media related to fraud detection. Fraud detection is achieved using a flexible scripting language and syntax that simplifies the generation of fraud detection rules. The rules are structured as conditional IF-THEN statements that include data objects referred to as Anchors and Add-Ons. The Anchors and Add-Ons used to generate the rules also correspond to a distinct data path for the retrieval data from any of a variety of data sources. The retrieval of data from the various data sources is optimized based on data dependencies within the rules. By knowing the data dependencies of each rule and utilizing parallelization of rule execution, the retrieval of data from the data sources is achieved efficiently so the rules can be executed quickly. The generated rules with optimized data paths are then converted using a transpiler from the scripting language into native language source code (e.g., PHP, Java, etc.) for deployment in a particular environment. The rules are then executed in real-time in the environment to detect potential fraudulent activity.

System Overview

Figure 1:
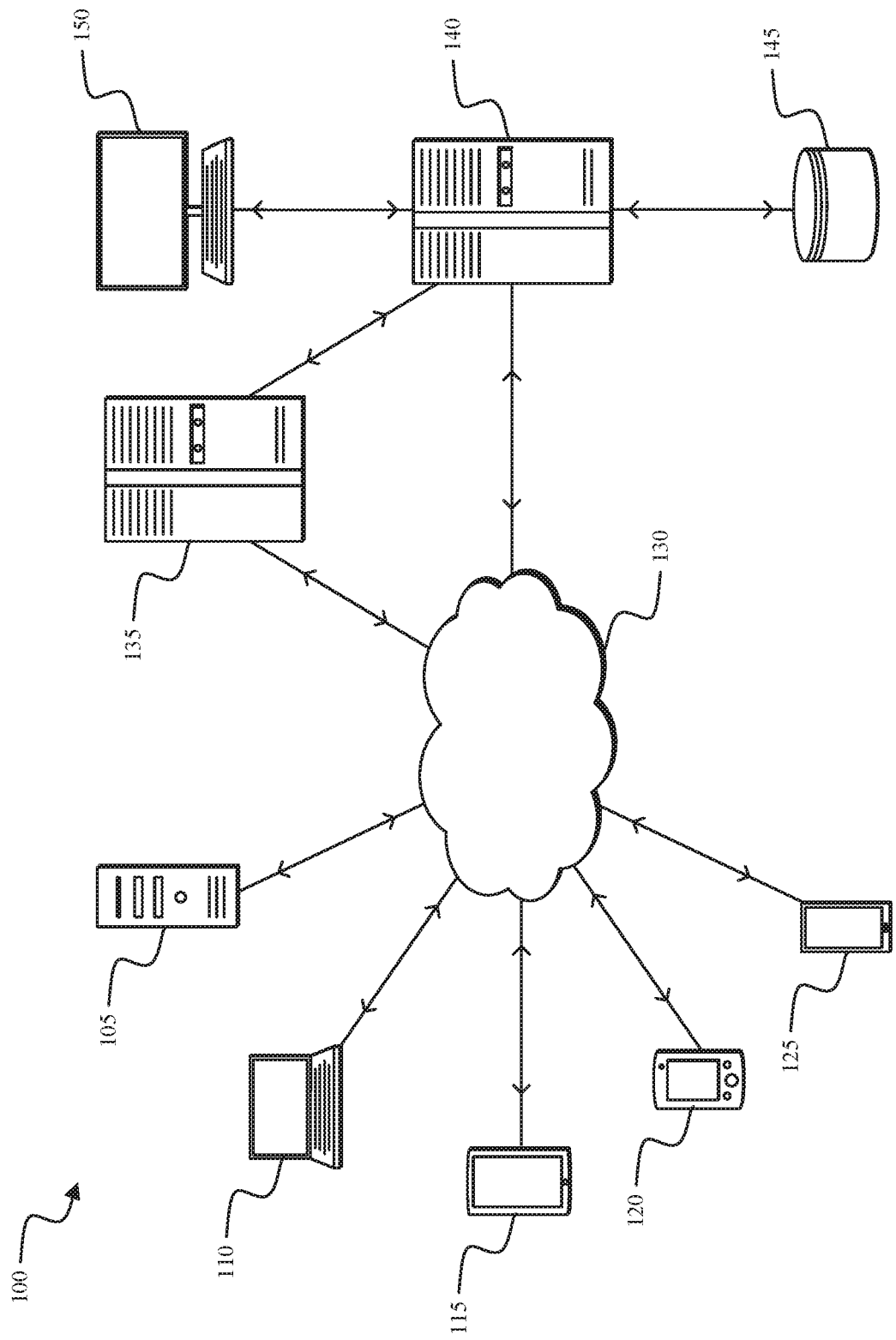
FIG. 1 illustrates a fraud detection system, according to embodiments described herein.

FIG. 1 illustrates a fraud detection system 100. The system 100 includes a plurality of client-side devices 105-125, a network 130, a first server-side mainframe computer or server 135, a second server-side mainframe computer or server 140, a database 145, and a server-side user interface 150 (e.g., a workstation). The plurality of client-side devices 105-125 include, for example, a personal, desktop computer 105, a laptop computer 110, a tablet computer 115, a personal digital assistant ("PDA") (e.g., an iPod touch, an e-reader, etc.) 120, and a mobile phone (e.g., a smart phone) 125. Each of the devices 105-125 is configured to communicatively connect to the server 135 or the server 140 through the network 130 and provide information to the server 135 or server 140 related to, for example, a transaction, a requested webpage, etc. Each of the devices 105-125 can request a webpage associated with a particular domain name, can attempt to login to an online service, can initiate a transaction, etc. The data sent to and received by visitors of a website will be generally referred to herein as client web traffic data. In the system 100 of FIG. 1, the server 135 represents a client server that is hosting a client website. Client web traffic data is produced as the devices 105-125 request access to webpages hosted by the server 135 or attempt to complete a transaction. The server 140 is connected to the server 135 and is configured to log and/or analyze the client web traffic data for the server 135. In some embodiments, the server 140 both hosts the client website and is configured to log and analyze the client web traffic data associated with the client website. In some embodiments, the server 140 is configured to store the logged client web traffic data in the database 145 for future retrieval and analysis. The workstation 150 can be used, for example, by an analyst to manually review and assess the logged client web traffic data, generate fraud detection rules, update fraud detection rules, etc. The logged client web traffic data includes a variety of attributes related to the devices interacting with the client website. For example, the attributes of the devices 105-125 include, among other things, IP Address, user agent, operating system, browser, device ID, account ID, country of origin, time of day, etc. Attribute information received from the devices 105-125 at the server 135 can also be stored in the database 145.

The network 130 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some implementations, the network 130 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio network, a Digital Enhanced Cordless Telecommunications ("DECT") network, a Digital AMPS ("IS-136/TDMA") network, or an Integrated Digital Enhanced Network ("iDEN") network, etc. The connections between the devices 105-125 and the network 130 are, for example, wired connections, wireless connections, or a combination of wireless and wired connections. Similarly, the connections between the servers 135, 140 and the network 130 are wired connections, wireless connections, or a combination of wireless and wired connections.

Figure 2:
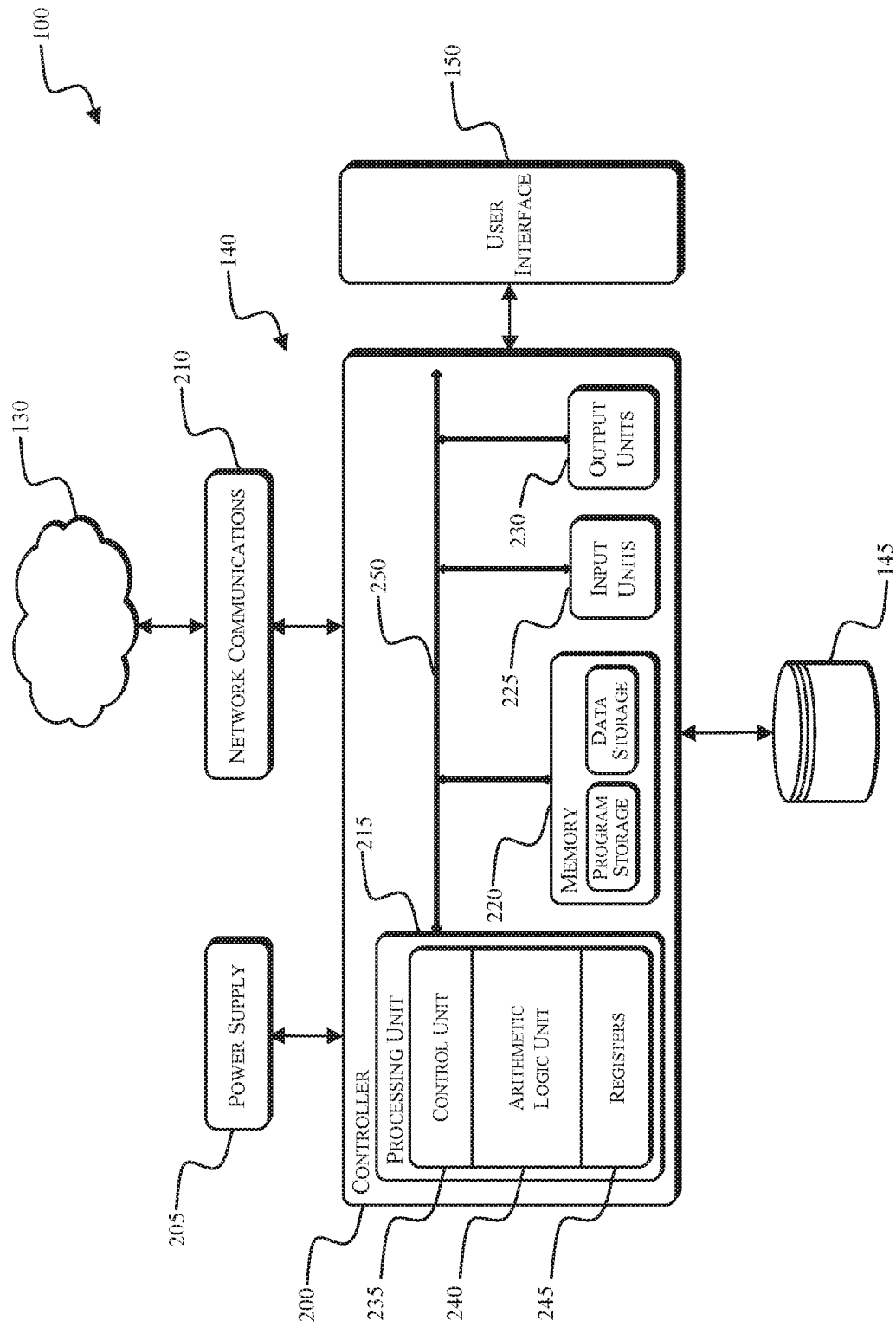
FIG. 2 illustrates a server-side processing device of the system of FIG. 1, according to embodiments described herein.

FIG. 2 illustrates the server-side of the system 100 with respect to the server 140. The server 140 is electrically and/or communicatively connected to a variety of modules or components of the system 100. For example, the server 140 is connected to the database 145 and the user interface 150. The server 140 includes a controller 200, a power supply module 205, and a network communications module 210. The controller 200 includes combinations of hardware and software that are operable to, for example, generate and/or execute fraud detection rules to detect fraudulent activity on a website. The controller 200 includes a plurality of electrical and electronic components that provide power and operational control to the components and modules within the controller 200 and/or the system 100. For example, the controller 200 includes, among other things, a processing unit 215 (e.g., a microprocessor, a microcontroller, or another suitable programmable device), a memory 220, input units 225, and output units 230. The processing unit 215 includes, among other things, a control unit 235, an arithmetic logic unit ("ALU") 240, and a plurality of registers 245 (shown is a group of registers in FIG. 2) and is implemented using a known architecture. The processing unit 215, the memory 220, the input units 225, and the output units 230, as well as the various modules connected to the controller 200 are connected by one or more control and/or data buses (e.g., common bus 250). The control and/or data buses are shown schematically in FIG. 2 for illustrative purposes.

The memory 220 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The processing unit 215 is connected to the memory 220 and executes software instructions that are capable of being stored in a RAM of the memory 220 (e.g., during execution), a ROM of the memory 220 (e.g., on a generally permanent basis), or another non-transitory computer readable data storage medium such as another memory or a disc.

In some embodiments, the controller 200 or network communications module 210 includes one or more communications ports (e.g., Ethernet, serial advanced technology attachment ["SATA"], universal serial bus ["USB"], integrated drive electronics ["IDE"], etc.) for transferring, receiving, or storing data associated with the system 100 or the operation of the system 100. In some embodiments, the network communications module 210 includes an application programming interface ("API") for the server 140 (e.g., a fraud detection API). Software included in the implementation of the system 100 can be stored in the memory 220 of the controller 200. The software includes, for example, firmware, one or more applications, program data, filters, rules, one or more program modules, and other executable instructions. The controller 200 is configured to retrieve from memory and execute, among other things, instructions related to the control methods and processes describe herein. In some embodiments, the controller 200 includes a plurality of processing units 215 and/or a plurality of memories 220 for retrieving from memory and executing the instructions related to the control methods and processes describe herein.

The power supply module 205 supplies a nominal AC or DC voltage to the controller 200 or other components or modules of the system 100. The power supply module 205 is powered by, for example, mains power having nominal line voltages between 100V and 240V AC and frequencies of approximately 50-60 Hz. The power supply module 205 is also configured to supply lower voltages to operate circuits and components within the controller 200 or system 100.

The user interface 150 includes a combination of digital and analog input or output devices required to achieve a desired level of control and monitoring for the system 100. For example, the user interface 150 includes a display (e.g., a primary display, a secondary display, etc.) and input devices such as a mouse, touch-screen displays, a plurality of knobs, dials, switches, buttons, etc.

Figure 3:
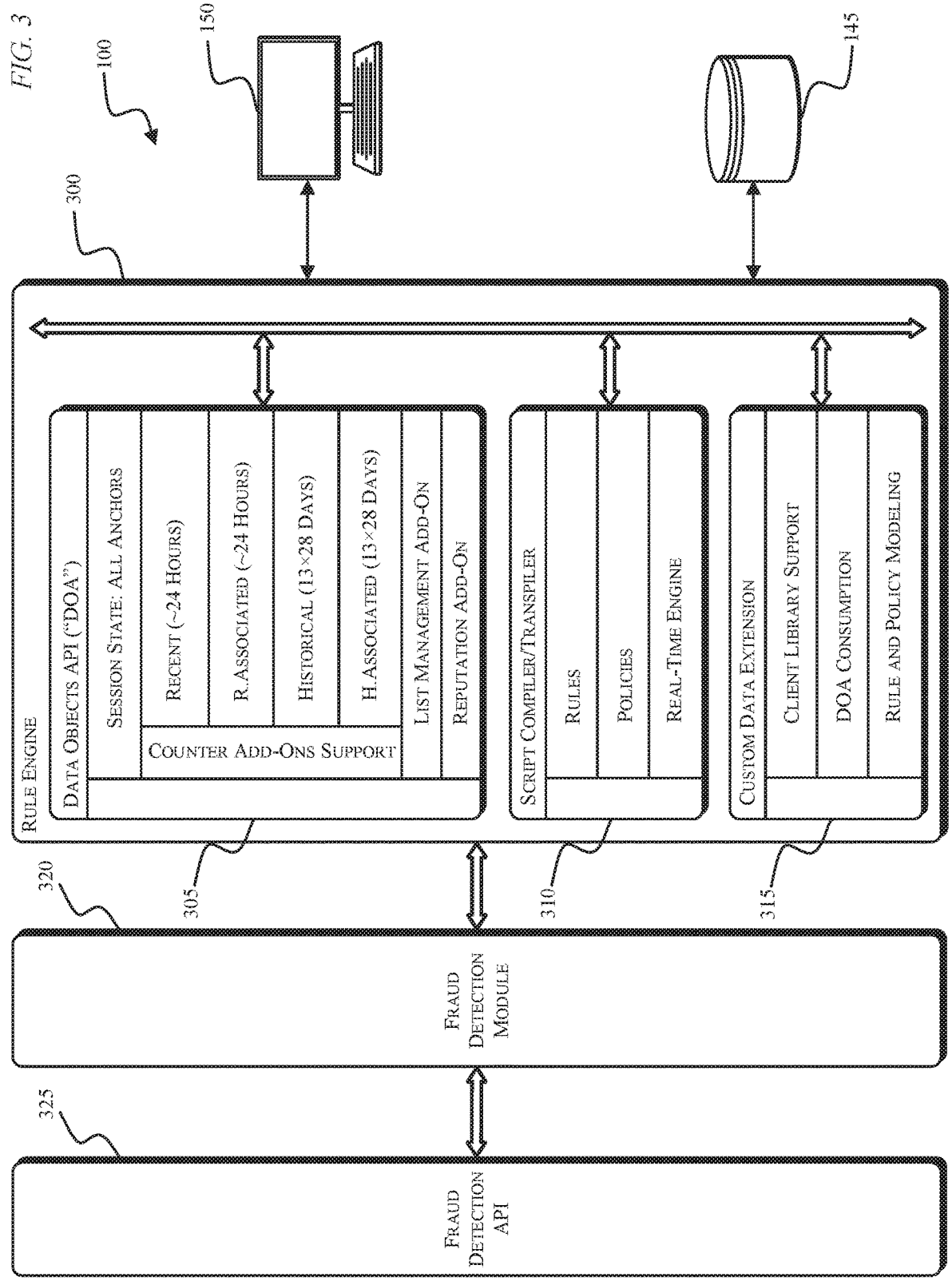
FIG. 3 illustrates a fraud detection rule engine within the system of FIG. 1, according to embodiments described herein.

The controller 200 can include various modules and submodules related to implementing the fraud detection system 100. For example, FIG. 3 illustrates the system 100 including the database 145, the workstation 150, and a rule module or engine 300. The rule engine 300 includes a data objects API 305, a Script compiler/transpiler 310, and a custom data extension 315. The data objects API 305 includes data points (e.g., Anchors, Add-Ons, etc.) that can be used to detect fraudulent activity. The data points stored in, for example, the database 145 and accessed by the data objects API 305 are described in greater detail below. The Script compiler 310 includes, for example, Script rules, Script policies, and a real-time engine or module. The operation of the Script compiler 310 is described in greater detail below. The custom data extension 315 can include, for example, client library support (e.g., for server 135), data objects API 305 consumption data, and rule or policy models that can be used by the Script compiler to, for example, generate fraud detection rules.

The data objects API 305 operates as an interface layer between data points used for fraud detection (sometimes referred to as sensors) and the rules that are executed to perform fraud detection (sometimes referred to as signals). The data points or data objects used by the rule engine 300 to generate fraud detection rules provide the rule engine 300 with access to informational, behavioral, and or analytical queries that use anchors as the basis of the query. An Anchor data point is an identifying reference found within particular session. Anchors can include, for example, an IP address, an account identifier, a device identifier, etc. Anchors function as the highest-level data points for fraud detection and as a base for lower-level subsets of data points. For example, the IP address Anchor can make geographical information about a device accessible to the data objects API 305. The Anchors support Add-Ons or Add-On attributes that can be used to provide non-session-level data, such as counters, lists, and reputation.

The Script compiler 310 interfaces with the data objects API 305 in a Script rules layer and a Script policies layer. The Script compiler 310 is configured to produce conditional expressions based on the Anchors and other data points to generate fraud detection rules. The fraud detection rules generated by the Script compiler 310 using a conditional scripting language can be transpiled by the Script compiler 310 and exported to, for example, a fraud detection module 320. The fraud detection module 320 uses a native programming language (e.g., PHP, Java, etc.). By transpiling the fraud detection rules from the conditional programming language to the native language, the fraud detection rules are capable of faster execution by the fraud detection module 320. The native language fraud detection rules can be executed by the fraud detection module 320 based on a request, information, or data received from a fraud detection API 325 of the system 100.

Figure 4:
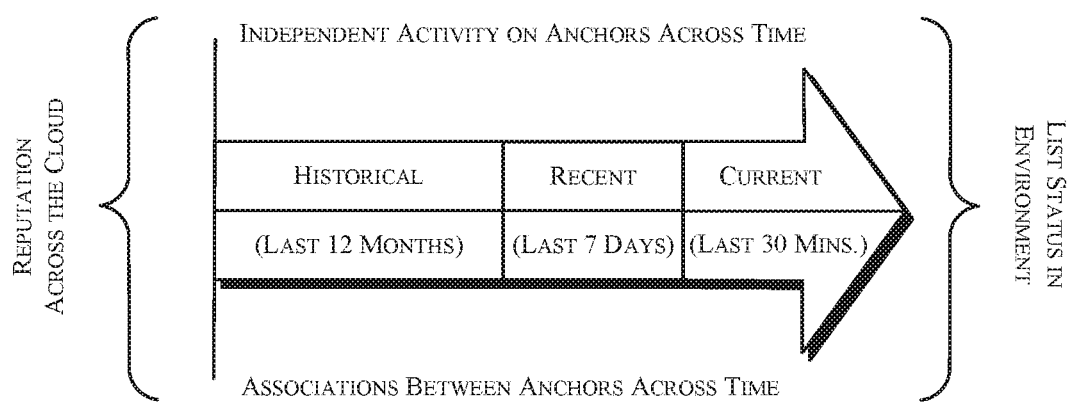
FIG. 4 illustrates four dimensions of information exposure for a data point within the system of FIG. 1, according to embodiments of the invention.

Information associated with each Anchor can be viewed from a high-level with respect to four dimensions, as illustrated in FIG. 4. First, independent activity for each Anchor is recorded across three time dimensions: (1) current or session (highest resolution); (2) recent (e.g., within the past seven days) using an existing counter mechanism; and historical (e.g., within the past twelve months) using the existing counter mechanism having different time bucket resolutions. Counters are used to monitor each Anchor across the three time dimensions (i.e., current, recent, historical). A counter is a tool used to count actions or properties of a request (e.g., Anchors and Add-Ons) for specific time bucket ranges. The counters provide temporal filters and enable aggregate questions that can be asked of a particular Anchor. Second, pairwise associations between Anchors are retained in a probabilistic manner across the same time dimensions as the independent anchor activity and using the existing counter mechanism. Third, local reputation (e.g., list status) using a white list or a black list are retained for each Anchor. Fourth, global or cloud reputation based on activity for each Anchor across all users of the system 100 (e.g., data for multiple clients).

Data Object Anchors

Anchors are standardized for all users of the system 100 and across all websites for which fraud detection is implemented. Anchors can be described generally as a simple Anchor, a complex Anchor, or a composite Anchor. A simple Anchor (e.g., IP Address) represents a single data point and provides multiple paths into different questions that can be asked of the data point (e.g., for any value that can be derived from the Anchor). A complex Anchor represents an aggregate of multiple properties and root-level methods that enable questions against the combined properties. For example, "Billing.value" implies a full billing address and "Billing.street" requests only the street name of the billing address. A composite Anchor (e.g., Endpoint) is composed or two or more other Anchor types for representing a concatenation of the Anchors as a combined entity. A composite Anchor provides properties based only on the concatenation of its source anchors and can exhibit behaviors of both simple Anchors and complex Anchors. Each Anchor has a corresponding data path for the data point. The data path is a representation of how the data objects API 305 will access the data point when a rule that references the data point is executed. Anchors can be sorted into a variety of categories, as shown below in TABLE 1.

TABLE 1

DATA OBJECT ANCHORS

| Category | Anchor Points |
| --- | --- |
| Core Anchors | IP Address ("IP") |
|  | Account |
|  | User Agent |
|  | Device Identification ("DID") |
|  | Device Fingerprint ("DFP") |
|  | Endpoint (IP + DFP) |
|  | Email Domain |
| Location Anchors | County |
|  | State |
|  | Zip Code |
| Mobile Anchors | iOS (IDFA and IDFV) |
|  | Android (Fingerprint and MAC) |
| Retail Anchors | Payment Instrument |
|  | Product SKU |
|  | Order Identification |
|  | Phone |

TABLE 1-continued

DATA OBJECT ANCHORS

| Category | Anchor Points |
|---|---|
| Fraud Detection Anchors | Device Session Input Characteristics Script Confidence Score Results |

Some Anchors in TABLE 1 are used more regularly in the system 100 than other anchors. For example, IP Address, User Agent, Device Identification, Device Fingerprint, Endpoint, Account, Input Characteristics, and Session are commonly used by the system 100. Each Anchor has a corresponding set of attributes. For example, IP Address includes attributes or data points for the IP Address itself, associated geographical information, network type, connection type, etc. User Agent includes browser and platform information. Device Identification is a persistent token attached to a device via a cookie. Device Fingerprint is a probabilistically unique identifier generated from characteristics associated with a device. Endpoint is a combination of IP Address and Device Fingerprint. Account is associated with a transaction and includes, for example, email information. Input Characteristics are measured across a session using, for example, JavaScript collector or mobile app dynamics. Session includes session information such as session identification, placement of a transaction, duration of a session, etc. Attributes are generally mapped to one of three data types: (1) string; (2) numeric; or (3) Boolean. The string data type maps a data point to a string value. The numeric data type maps a data point to a ranged numeric real-number or floating point value. The Boolean data type maps a data point to a true or false binary value. In some embodiments, a combination of an Anchor and one or more attributes for the Anchor is referred to as a data contract. Examples of common attributes for common Anchors are provided below in TABLES 2-12. TABLES 2-12 are provided for illustrative purposes and do not represent a comprehensive list of all possible anchor attributes.

TABLE 2

SESSION ATTRIBUTES

| Attribute | Type | Description |
|---|---|---|
| Session | String | Session identification |
| Header | String | Header query |
| DurationSecs | Numeric | Duration of a session in seconds |

TABLE 3

IP ADDRESS ATTRIBUTES

| Attribute | Type | Description |
|---|---|---|
| IP Address | String | IP Address for a session |
| IsAnonymous | Boolean | True if connection is attempting to mask identity |
| Latitude | Numeric | Latitude of location for IP Address |

TABLE 4

USER AGENT ATTRIBUTES

| Attribute | Type | Description |
|---|---|---|
| User Agent | String | Current User Agent |
| Ismobile | Boolean | True if device is identified as a mobile device |
| Count | Numeric | Number of different user agents seen during a session |

TABLE 5

DEVICE IDENTIFICATION ("DID") ATTRIBUTES

| Attribute | Type | Description |
|---|---|---|
| DID | String | Last DID for a session |
| Ismismatch | Boolean | True if session event had different DIDs |
| Count | Numeric | Number of DIDs seen during a session |

TABLE 6

DEVICE FINGERPRINT ("DFP") ATTRIBUTES

| Attribute | Type | Description |
|---|---|---|
| DFP | String | Lowest entropy fingerprint associated with a device |
| Ismismatch | Boolean | True if multiple DFPs observed in a session |
| Count | Numeric | Number of different DFPs observed in a session |

TABLE 7

ENDPOINT ATTRIBUTES

| Attribute | Type | Description |
|---|---|---|
| Endpoint | String | Endpoint most recently seen in a session |
| Isbotnet | Boolean | True if a botnet is detected |
| Count | Numeric | Number of different endpoints seen in a session |

TABLE 8

ACCOUNT ATTRIBUTES

| Attribute | Type | Description |
|---|---|---|
| Account | String | Account ID most recently seen in a session |
| Isemail | Boolean | True if Account ID is an email format |
| Domaincount | Numeric | Number of different email domains seen in a session |

TABLE 9

PHONE NUMBER ATTRIBUTES

| Attribute | Type | Description |
|---|---|---|
| PhoneNumber | String | Phone number most recently seen in a session |
| First | String | First phone number seen in a session |
| Count | Numeric | Number of phone numbers seen in a session |

TABLE 10

FINANCIAL TRANSFER DATA ATTRIBUTES

| Attribute | Type | Description |
| --- | --- | --- |
| Type | String | Type of transfer |
| Amount | String | Amount of transfer in client-defined currency |
| Date | String | Date of transfer in ISO 8601 format |

TABLE 11

INPUT CHARACTERISTICS ATTRIBUTES

| Attribute | Type | Description |
| --- | --- | --- |
| Numclicks | Numeric | Number of mouse clicks measured |
| Numtouches | Numeric | Number of touch events measured |
| Ismissing | Boolean | True if input characteristics are missing |

TABLE 12

SCRIPT DETECTION ATTRIBUTES

| Attribute | Type | Description |
| --- | --- | --- |
| Verifycookie | Boolean | True if cookie is seen and is a valid cookie |
| Isspoofing | Boolean | True if device is being spoofed |
| Isreplay | Boolean | True if input was replayed |

Data Object Add-Ons

Add-Ons are applied to Anchors and/or data elements within the Anchors. Each Add-On has a specified function set and that function set is mirrored to every Anchor that includes the Add-On. Add-Ons include: (1) Activity Add-Ons; (2) Associated Activity Add-Ons; (3) List Add-Ons; and (4) Reputation Add-Ons. Activity is a detailed history of activities and the results of those activities aggregated over time. Associated Activity is an activity measured across two Anchors and over time. List can refer to, for example, a blacklist, a whitelist, etc. Reputation is a normalization of activity across data points and across a plurality of users/customers.

The Activity Add-On applied to an Anchor provides visibility beyond a current session and exposes information such as, statuses, validation actions, and risk score results for all historical transactions associated with that Anchor for a specified timeframe. For example, when an Activity Add-On token is appended to an Anchor token, a list of activities and their associated results become accessible for evaluation. As shown in FIG. 4, three temporal modes for the Activity Add-On identification can be used: (1) current; (2) recent; and (3) historical. In some embodiments, the current temporal mode accesses all event data associated with the Anchor in the past thirty minutes (e.g., as six five minute periods). The recent temporal mode accesses all event data associated with the Anchor in the previous seven days (e.g., as 168 one hour periods). The historical temporal mode accesses all event data associated with the Anchor in the previous year (e.g., as 52 one week periods).

The Activity Add-On token includes all placements or validation actions paired with corresponding statuses and results. Activities can be cataloged according to: (1) action; (2) placement; and (3) score. An action is a specific validation action, such as an authentication action, a create account action, a balance check action, a payment instrument action, an edit account email action, and edit account password action, an edit account phone action, and edit payment instrument action, a financial transfer action, or a purchase action. Placement accounts for all action activities carried out on a placement. A placement is a part of a distinct workflow or set of actions that a particular client's customer would perform on the client's website. Placements are typically named using a verb, such as login, create account, payment, etc. For example, authenticating and creating a new account can both occur while on a create account placement. Score corresponds to a total risk score assigned to an action or placement and can be grouped into green, yellow, and red bands based on a determined risk level. The score is determined based on the rules and policies that the system 100 executes. In some embodiments, the Activity Add-On includes a method token that contains a full set of aggregation functions to evaluate the score results (e.g., count, minimum, maximum, average, etc.).

The Associated Activity Add-On enables combinatorial evaluations across two Anchors with an Associated Activity and visibility beyond the current session. Like the Activity Add-On, three temporal modes for the Associated Activity Add-On identification can be used: (1) associated-current; (2) associated-recent; and (3) associated-historical. In some embodiments, these temporal modes share the same time ranges and resolutions as their Activity Add-On counterparts. The Associated Activity Add-On also shares the same actions, placements, scores, and method tokens as the Activity Add-On.

The List Add-On enables the system 100 to determine if an Anchor is attached to a list. List types can include a blacklist, a whitelist, a greylist, a trusted list, or a custom list. The blacklist corresponds to confirmed or strongly suspected fraud or a high rate of negative activity. The whitelist corresponds to users that can be, for example, removed from a false-positive scenario. The greylist corresponds to possible fraud, negative activities, or Anchors that are being monitored.

The Reputation Add-On is used to access risk data across a plurality (or all) users/customers (e.g., consortium or cloud risk data) for select data points. The select data points include IP Address, Email Address, Email Domain, and Endpoint (i.e., IP Address and Device Fingerprint). The Reputation Add-On is then used to determine a cloud or consortium risk score with respect to all or a plurality of users/customers of the system 100. A risk score with respect to the overall system 100 normalizes activity across data points and provides a numerical (e.g., percentile) risk score in view of all activity through the system 100.

The Reputation Add-On calls a separate risk consortium database (or separate partition of database 145) that is constructed using periodic, system-wide queries of the system 100 (e.g., monthly). The risk consortium database is a narrow table including an index type, an index, and a risk percentile associated with each of the select data points. The Reputation Add-On returns a percentile integer having a value, for example, of between 1 and 100. A percentile integer of 1 represents the lowest risk of fraud, and a percentile integer of 100 represents the highest risk of fraud. The percentile integer can be calculated based on a distribution of activity over a time period (e.g., 3-12 months). In some embodiments, the percentile integer factors in traffic volume. A risk score for one of the select data points can be calculated as a sum of events over the time period. The risk score increases each time the select data point has its fraud risk scored. The greater the risk associated with the data point, the more the risk score increases. The aggregate risk score can then be normalized to a value between 1 and 100 for the risk percentile of the data point over the time period.

In some embodiments, if no index for determining Reputation is available, a percentile integer of 1 is returned.

Functions

In some embodiments, additional functions are available to the system 100 that are not appended to an Anchor. Examples of additional functions include a string helper function, a math helper function, a date helper function, a geographic helper function, a conversion helper function, etc. The string helper function is used to manipulate or extract information about a particular parameter (e.g., length). The math helper function is used to perform mathematical operations on one or more metrics (e.g., min, max, mean, median, between, etc.). The date helper function is used to format date and time inputs or calculate a difference between dates. The geographic helper function is used to check a distance between two coordinates or identify a geographical point from a location. The conversion helper function is used to convert an input into a different data type (e.g., currency conversions).

Rule and Policy Generation

Figure 5:
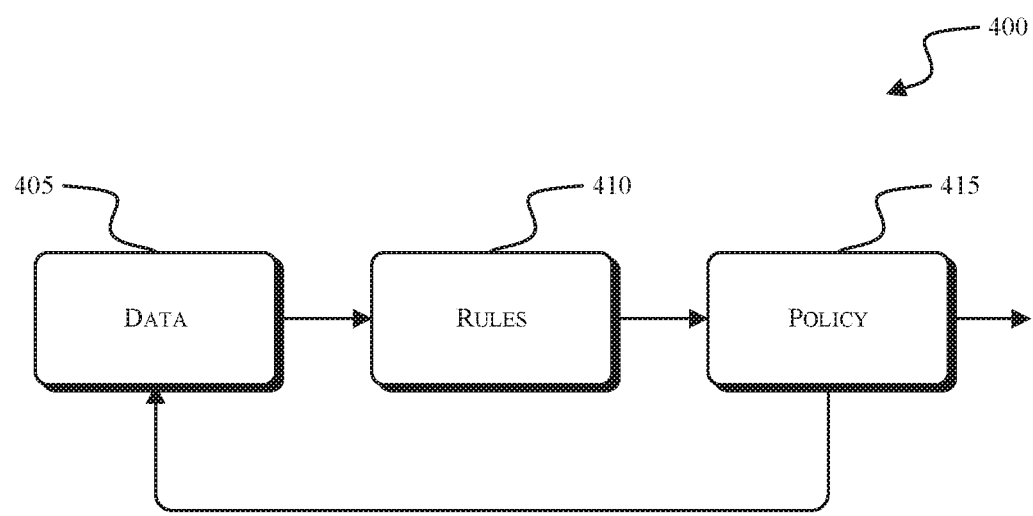
FIG. 5 illustrates a high-level architecture for a rule engine scripting language, according to embodiments described herein.

The system 100 uses the Script compiler/transpiler 310 to generate fraud detection rules and policies that can be stored in the database 145. The Script compiler 310 is configured to produce conditional expressions that operate as fraud detection rules based on the Anchors, Add-Ons, and any other data points accessible by the data objects API 305. The conditional expressions are constructed using a lightweight scripting language ("Script"). The rule engine 300 implements a three-tier system for rule and policy configuration. With reference to FIG. 5, data 405 is collected from a variety of sources using the data objects API 305. The data 405 is provided to the Script compiler 310 for analysis. The Script compiler 310 generates one or more rules 410 that can be used by the fraud detection module 320 to evaluate and score fraud risks. Policies 415 receive the outputs from the rules 410 (e.g., rules, scores, etc.) and can be used to determine one or more actions to take based on the outputs from the rules 410. For example, policies 415 can be used to directly modify the data 405 (e.g., add an item to a whitelist, etc.) and/or send a recommended action (e.g., permit transaction, deny transaction, etc.) to an application (e.g., a client application through the fraud detection API 325, etc.).

Figure 6:
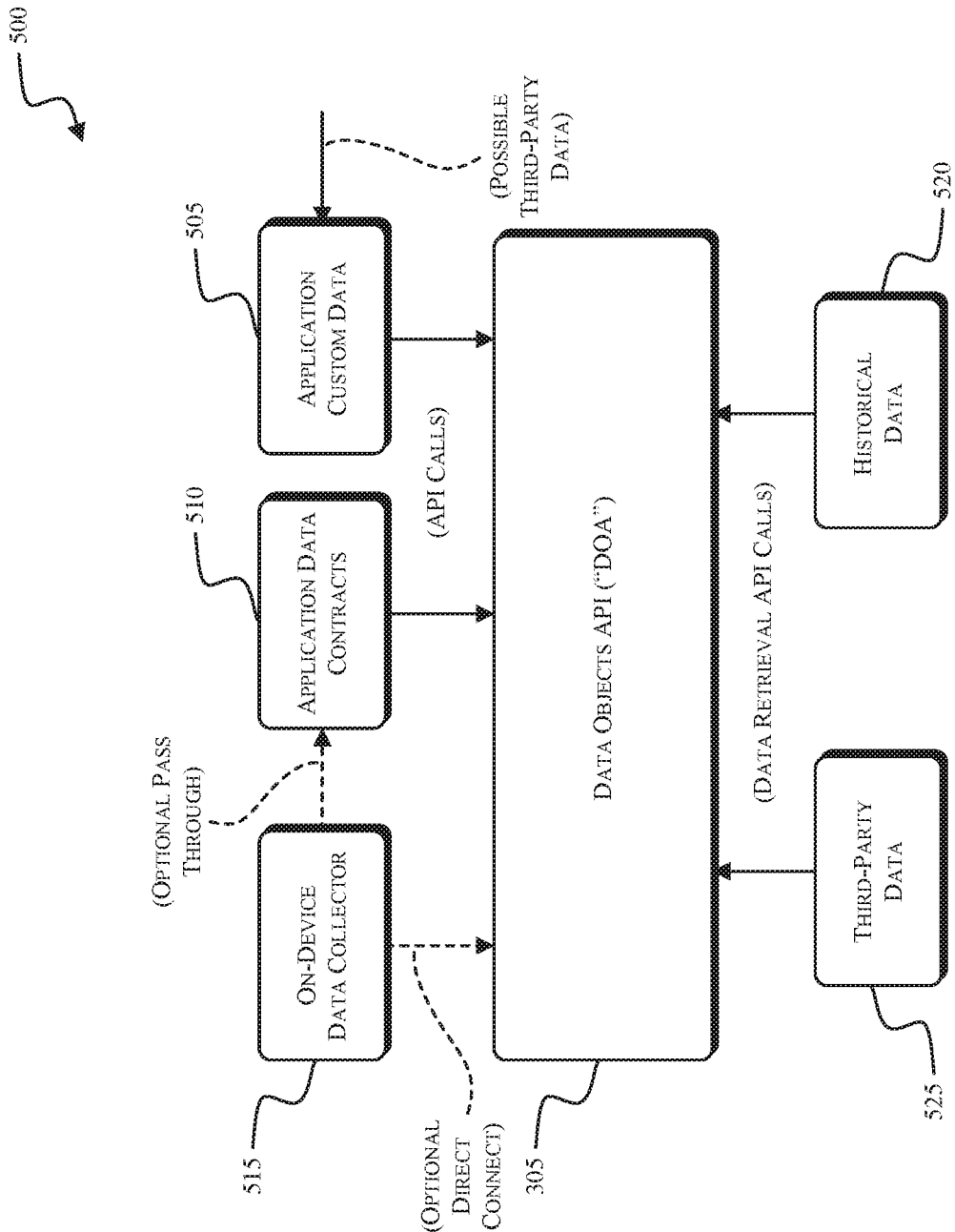
FIG. 6 illustrates data gathering from a variety of data sources, according to embodiments described herein.

As shown in FIG. 6, the data 405 can be collected from a variety of sources. For example, the data objects API 305 can collect custom application data 505 through API calls. In some embodiments the custom application data is third-party data. The data objects API 305 can also collect application data contracts (e.g., Anchors and attributes) 510. In some embodiments, the data objects API 305 also collects device-related data either directly or by having a device pass data via the application data contracts 510. The data objects API 305 can further retrieve historical data 520 and third-party data 525 based on a session data point. The data objects API 305 is then configured to organize the collected data into the Anchors and Add-Ons described above. Each attribute of an Anchor contains data about a current or previous session and can be accessed using a data path (described below). References to a data source used herein should be considered references to any of the data sources illustrated in FIG. 6 or other data sources accessible by the system 100.

The collected Anchors and Add-Ons can be presented as a dashboard through the workstation 150 for the manual generation of fraud detection rules, or the Script compiler 310 is configured to automatically generate fraud detection rules based on the collected Anchors and Add-Ons. Each generated rule is structured as a conditional IF-THEN type statement. For example:

```
if    (anchor.attribute1 > anchor.attribute2) then
      RULE.TRIGGER
end
```

If the condition or conditions of a rule are satisfied, the rule is triggered. Rules can also be structured as nested IF-THEN statements, IF-ELSEIF statements, etc. Rules are executed in a three step model where all referenced values in the rule are calculated, error checked, and then the rule is executed. If a rule is triggered, execution of the rule is halted and the status of the rule is set to triggered. Once triggered, a score is assigned to the rule. The score can be a score value set in the rule configuration, a normalized value of a default score, or an input value. In some embodiments, rules are executed in parallel to one another. In some embodiments, rules are unable to reference one another or an output of another rule.

After all rule execution is completed, policies are used to reappraise the rule execution results and modify the risk score assigned by the rules. Policies are executed in a defined sequence (e.g., top-to-bottom of a policy list) and follow the same three step execution model as rules. In some embodiments, policy execution is not halted when the policy is triggered.

Policies have access to all the same data points (i.e., Anchors and Add-Ons) as rules, and policies share the same conditional IF-THEN structure for each statement:

```
if    (ScoreResult.Rules.Contains ("custom_high_risk_device"))
      then POLICY.INDERDICT ("StepUpAuth")
end
```

Policies can be used to update the results of rule execution. For example, policies can be used to clear a rule (e.g., score impact of rule removed), set a rule to triggered, add an offset to a risk score, etc. Following the execution of all policies, final risk score results are recalculated to produce an updated score.

The dashboard accessible through the workstation 150 allows a system 100 user or fraud analyst to generate new rules and policies, update existing rules and policies, and monitor rules and policies that have changed since deployment (e.g., rules or policies automatically updated or changed by the system 100). The dashboard also permits access to any Anchor or Add-On for the purpose of viewing, modification, deletion, or incorporation into a new rule or policy. In some embodiments, the system 100 includes tens of thousands of data points that are used to generate millions or, in some embodiments, billions of rules to be executed by the system 100.

In some embodiments, the system 100 automatically generates new rules and policies or automatically updates existing rules and policies. For example, based on the Anchors and Add-Ons known to the system 100, the system 100 generates rules and policies based on historical knowledge of which Anchors and Add-ons are most likely to be indicative of fraudulent activity (e.g., based on previously calculated risk scores). For a new website, which would typically require a full new set of fraud detection rules to be generated, the system 100 can automatically generate the rules based on the Anchors and Add-Ons specific to that website.

Data Path Optimization

Each data point corresponds to data that the system 100 will need to retrieve from a data source in order to execute the rules and policies that have been generated for a particular website. Each unique data point has a corresponding data path that allows the system 100 to retrieve data from the corresponding data source.

Figure 7:
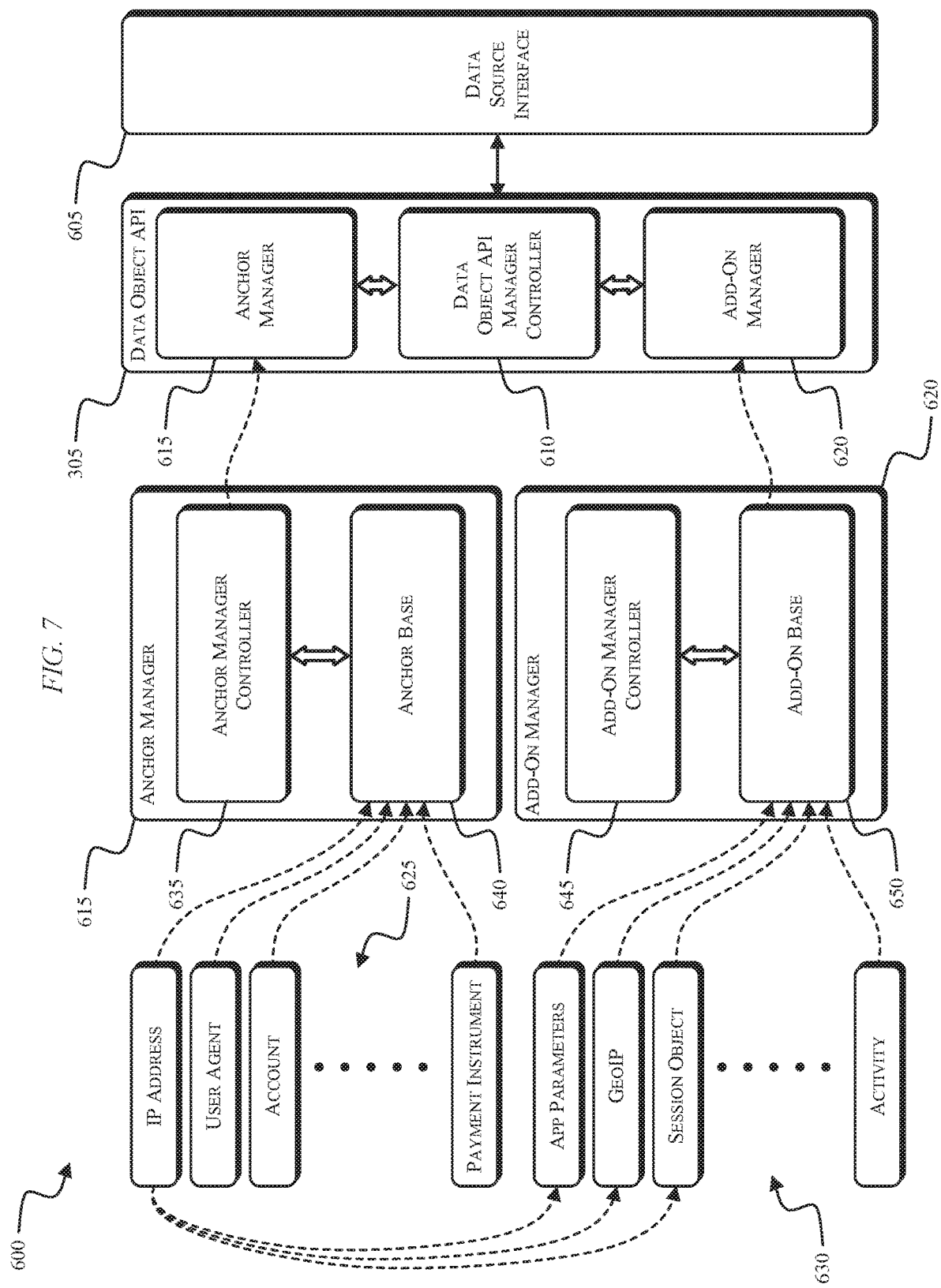
FIG. 7 illustrates data paths for Anchors and Add-Ons, according to embodiments described herein.

A diagram 600 of data paths for data objects within the system 100 is illustrated in FIG. 7. The diagram 600 of FIG. 7 is illustrative of how the data objects API 305 retrieves data from various data sources. The data objects API 305 is connected to a data source interface 605. In some embodiments, the data source interface 605 interacts with the Script compiler 310, the fraud detection module 320, or the fraud detection API 325. The data objects API 305 includes a data objects API manager controller 610 that interfaces with an Anchor manager 615 and an Add-On manager 620. The Anchor manager 615 is configured to retrieve a plurality of data object Anchor values 625 from one or more data sources. The Anchor manager 615 includes an Anchor manager controller 635 and an Anchor manager base module 640 that stores a list of Anchor data paths. The Anchor manager 615 is responsible for parsing each Anchor identifier and creating lists of paths keyed by each Anchor identifier. Each list of paths can then be validated and registered with the Anchor. Similarly, the Add-On manager 620 includes an Add-On manager controller 645 and an Add-On base module 650 that stores a list of Add-On data paths. The Add-On Manager 620 is configured to retrieve a plurality of data object Add-On values 630 from one or more data sources. As illustrated in FIG. 7, any number of Anchors can use any number of Add-Ons.

The data paths are programmatically generated and compiled into a list of data paths. In some embodiments, the list of data paths is indexed into a registry (e.g., database 145, memory 220, registers 245, etc.) that represents all supported data points. Each data point contains references to code external to the Script language that are used to initialize the data points to actual values during run-time. In some embodiments, each data path is a dot-separated, alphanumeric string that reflects a hierarchical structure of complex data in human readable format. Each data path corresponds to a particular data point. The format of the data paths is tokenized such that each token tells the data objects API 305 where to look for the corresponding data. Each data path is composed of the Anchors and the Add-Ons described above. The Anchor is a first token and represents information that exists within a current request or session. The Add-On is a second token and represents data that extends from the Anchor (e.g., location information that extends from IP Address). Each Add-On represents a unique data source. When an Add-On is configured to interact with an Anchor (e.g., in a rule or policy), a number of data paths can be automatically generated for gathering data for the Anchor from the different data sources.

Figure 8:
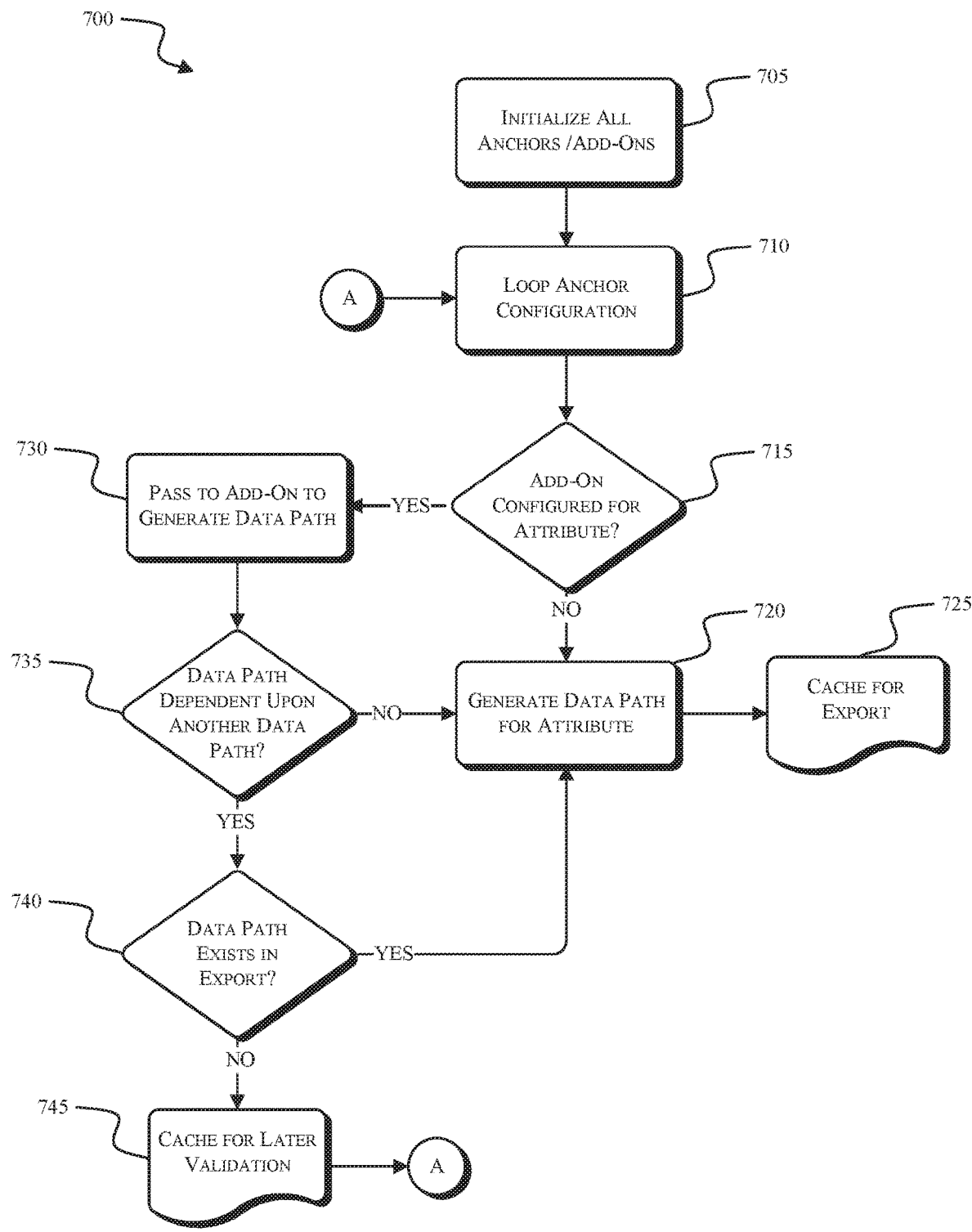
FIG. 8 illustrates a process for generating paths for data points, according to embodiments described herein.

FIG. 8 illustrates a process 700 for generating data paths. At STEP 705, all Anchors and all Add-Ons are initialized. The process 700 can be configured to loop during Anchor configuration (STEP 710). In some embodiments, the process 700 is set to loop twice. At STEP 715, the rule engine 300 (e.g., Anchor manager 615) determines if an Anchor has an Add-On configured for an Anchor attribute. If there is no Add-On at STEP 715, a data path is generated for the Anchor attribute (STEP 720). In some embodiments, the generated data path for the attribute includes a callable path code. After the data path has been generated, the data path is cached for export (STEP 725). If, at STEP 715, an Add-On was configured for the Anchor attribute, the rule engine 300 passes the Anchor attribute to, for example, the Add-On manager 620 to generate the data path (STEP 730). At STEP 735, the rule engine 300 determines whether the data path is dependent upon another data path. If the data path is not dependent upon another data path, the data path is generated (STEP 720) and cached for export (e.g., for validation and registration) (STEP 725). If the data path is dependent upon another data path, the rule engine 300 determines whether the data path to which the new data path depends already exists in the cache of data paths for export (STEP 740). If that data path is in the cache, the new data path is generated (STEP 720) and cached for export (e.g., for validation and registration) (STEP 725). If that data path is not in the cache, the dependent data path is cached for later validation (STEP 745), and the process 700 loops back to STEP 710.

The number of data paths generated for all of the generated rules can be extremely high. For example, in some embodiments, each counter includes its own path that can be concatenated with Anchor paths to produce a full data path. If the system 100 implements three temporal modes corresponding to resolutions of 6×5 minutes (current session), 24×1 hour (recent), and 12×28 days (historical), 42 different data paths are generated. If six properties of an Anchor are then associated with a counter, 252 data paths for that Anchor alone would be generated. Tokenizing the data paths significantly reduces the amount of hard coded data required to implement the system 100. As a result, the token framework for data path generation also significantly reduces maintenance of the system 100 and allows for rapid updating of the system as new Anchors and new Add-Ons are added to the system.

The data paths that are generated based on the Add-Ons can also vary based on a type of Add-On that is associated with an Anchor. For example, sub-property data paths are generated when a sub-property of an Anchor is added to a rule (e.g., IP.Geo.country for a GeoIP country query). Augmented data paths augment existing data paths within an Anchor (e.g., IP.value.Current.Login.Success.count(3)). In such an example, everything after IP.value is the augmented data path. A shadow Add-On does not generate any additional data paths in an Anchor and is strictly for internal use by the Anchor. In some embodiments, Add-On functionality is enabled by attaching an Add-On to a specific property of an Anchor.

Rule execution can be optimized using the generated data paths and based on the availability of data from the different data sources. For example, the system 100 can access hundreds of thousands of data points from many different data sources, and clients can customize and configure a scoring system for their website based on different types of requests. Not all data points being used in the rules and retrieved from the data sources need to be retrieved for each request that is received by the system 100. Additionally, some data that is gathered by the system 100 is dependent upon other data that is also being gathered by the system 100. As a result, some data can be prioritized and gathered more quickly than other data. The data gathering process can be optimized using parallel data paths and timed such that a desired speed and efficiency for the execution of the rules can be achieved. In some embodiments, the system 100 must be able to execute at least 100 rules (each rule being three lines long) in less than 10 milliseconds. In some embodiments, execution of all rules associated with generating a fraud risk score are executed in 300 or fewer milliseconds.

Figure 9:
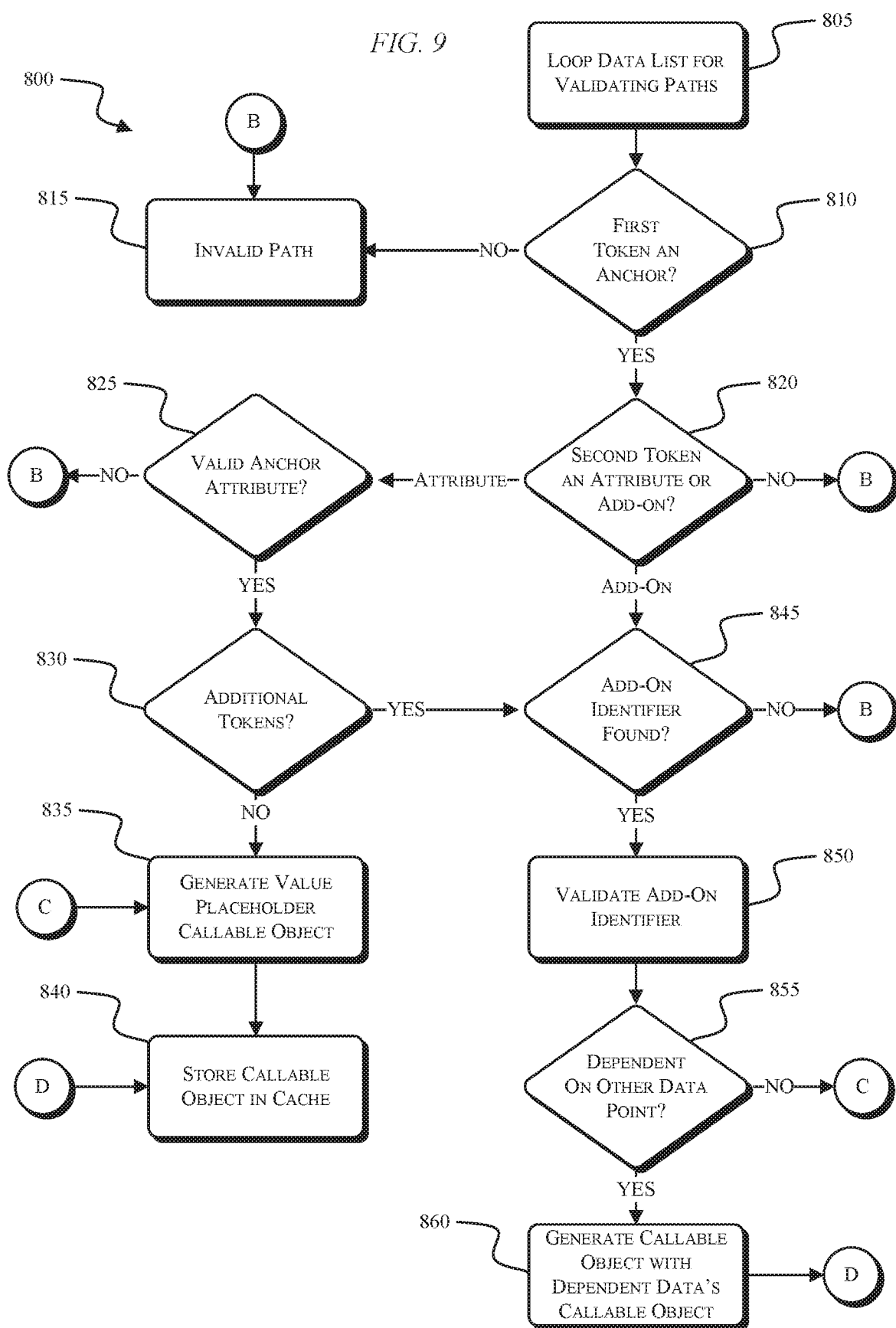
FIG. 9 illustrates a process for optimizing organization of data paths to improve run-time execution of fraud detection rules, according to embodiments described herein.

FIG. 9 is a process 800 for validating and registering individual data paths. At STEP 805, the rule engine 300 loops a data list for validation of data paths. If, at STEP 810, a first token is not an Anchor token, the data path is determined to be invalid (STEP 815). If the first token is an Anchor token, the rule engine 300 determines whether the second token is an Anchor attribute or an Add-On identifier (STEP 820). If the second token is neither an Anchor attribute or an Add-On identifier, the data path is determined to be invalid (STEP 815). If the second token is an Anchor attribute, the Anchor attribute is validated as a valid attribute for the Anchor (STEP 825). If, at STEP 825, the attribute is not a valid attribute for the Anchor, the data path is determined to be invalid (STEP 815). If the attribute is a valid attribute for the Anchor, the rule engine 300 determines if the data path includes any additional tokens (STEP 830). If there are no additional tokens in the data path, a value placeholder callable object is generated (STEP 835), and the callable object is stored in a cache (STEP 840). If, at STEP 830, the data path included an additional token, or at STEP 820, the second token was an Add-On identifier, the rule engine 300 searches for the Add-On identifier (STEP 845). If the Add-On identifier is not found, the data path is determined to be invalid (STEP 815). If the Add-On identifier is found, the rule engine 300 validates the Add-On identifier (STEP 850). The rule engine 300 then determines whether the data path is dependent upon any other data points (STEP 855). If the data path is not dependent upon any other data points, a value placeholder callable object is generated (STEP 835), and the callable object is stored in a cache (STEP 840). If, at STEP 855, the data path is dependent upon another data point, a callable object is generated that includes the dependent data point's callable object (STEP 860) and the callable object is stored in a cache (STEP 840). In some embodiments, the list of validated data paths is indexed into a registry (e.g., database 145, memory 220, registers 245, etc.).

Figure 10:
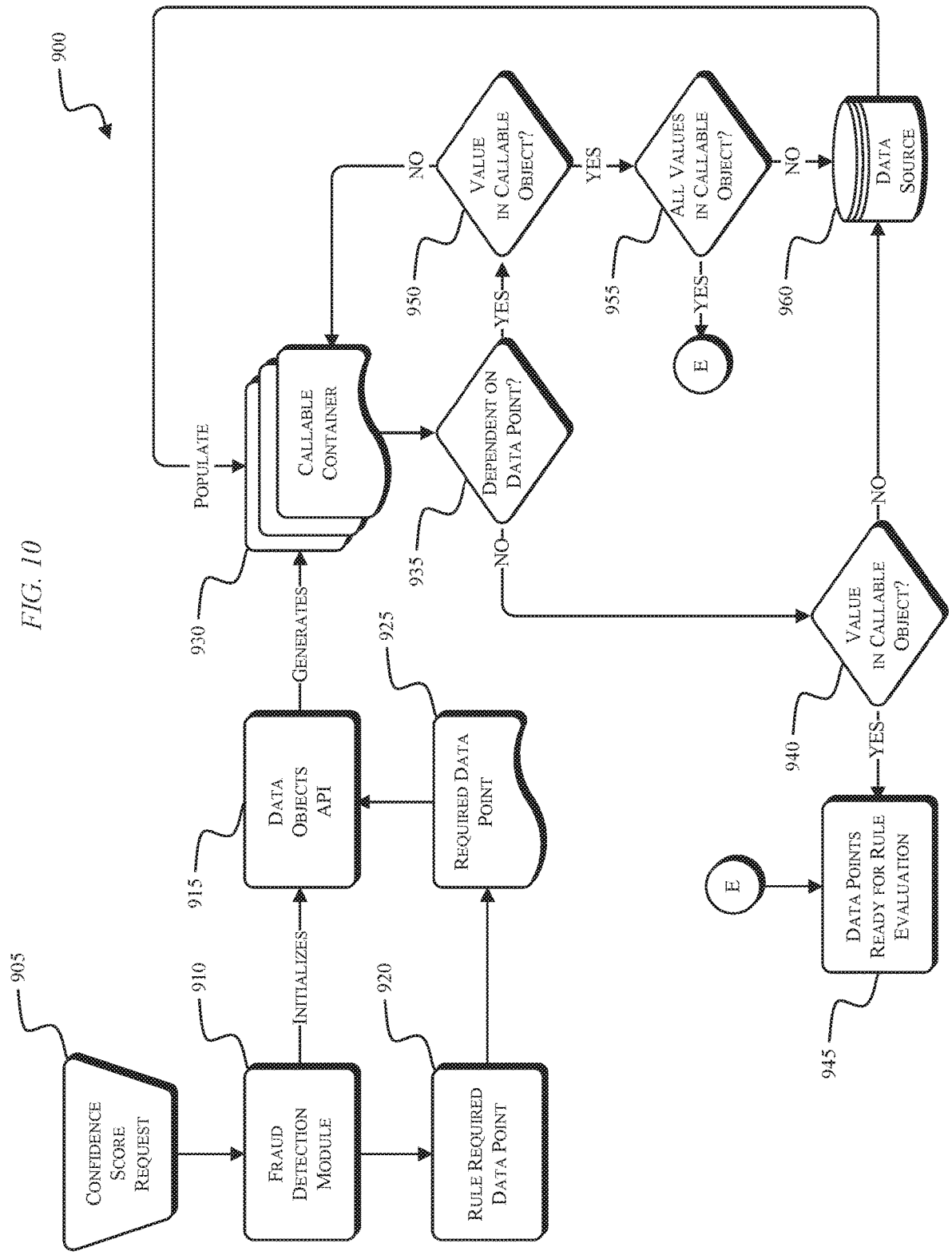
FIG. 10 illustrates a functional system diagram for optimizing the run-time execution of fraud detection rules, according to embodiments described herein.

After all of the data paths have been validated and the callable objects generated, the system 100 is able to use the callable objects to gather data during rule execution. Each data point has a pointer that points to a placeholder callable object generated using the process 800. A process 900 for optimized run-time execution of fraud detection rules is illustrated in FIG. 10 as a functional system diagram. At STEP 905, a confidence score request related to potentially fraudulent activity is received by the system 100 (e.g., through the fraud detection API 325). The confidence score request is provided to the fraud detection module 320 (STEP 910), which causes the data objects API 305 to be initialized (STEP 915). In some embodiments, one or more of the fraud detection rules includes a required data point (STEP 920). If there is a rule required data point, the required data point is provided to the data objects API 305 (STEP 925). The data objects API 305 then generates a callable container that includes the callable objects for each data point that were generated using the process 800 (STEP 930).

For each callable object in the callable container, the system 100 determines if the callable object has a dependency upon another data point (STEP 935). If the callable object does not include any dependencies, the system 100 determines whether there is a value in the callable object (STEP 940). If there is a value in the callable object at STEP 940, a data point value for the callable object has been retrieved and is ready for use in rule evaluation (STEP 945). If, at STEP 940, there is no value in the callable object, a data point value is retrieved from a data source (STEP 960), and the callable object is populated with that value at STEP 930. Different data sources can be called at different times based on dependencies of a particular data point. If, at STEP 935, the callable object is dependent upon another data point, the system 100 determines if a value for that data point is present in the callable object (STEP 950). If a value is present in the callable object, the system 100 determines if all values required by the callable object are present in the callable object (STEP 955). If all values required by the callable object are present in the callable object, all required data point values for the callable object have been retrieved and are ready for use in rule evaluation (STEP 945)

If, at STEP 955, not all values are present in the callable object, one of the data points from which the callable object is dependent is in the callable object and another data point for the callable object can be retrieved from the data source (STEP 960). If there is no value in the callable object at STEP 950, the data point from which the callable object is dependent has not yet been retrieved and the process 900 returns to the callable container at STEP 930 where the next callable object is called. In some embodiments, the system 100 accesses data from the data sources for multiple callable objects in parallel (e.g., for callable objects that are not dependent upon another data point). In some embodiments, the system 100 does not call a callable object in the callable container until all callable objects that are not dependent upon another data point have been used to retrieve data from a data source. In other embodiments, the system 100 calls a callable object in the callable container that is dependent upon another data point after that data point has been retrieved and before all non-dependent callable objects have been used to retrieve data from a data source.

Transpilation

A transpiler is a software tool that converts source code from one programming language (i.e., a first programming language) to another programming language (i.e., a second programming language) at the same level of abstraction. The Script language and its syntax that are used to generate the rules and policies described above can be formally described using parsing expression grammar(s) ("PEG"). PEGs are maintained as source definitions of the Script language and are relied upon by the system 100 for compiling rules and policies so they can be used by the system 100 to detect fraudulent activity on a website.

Figure 11:
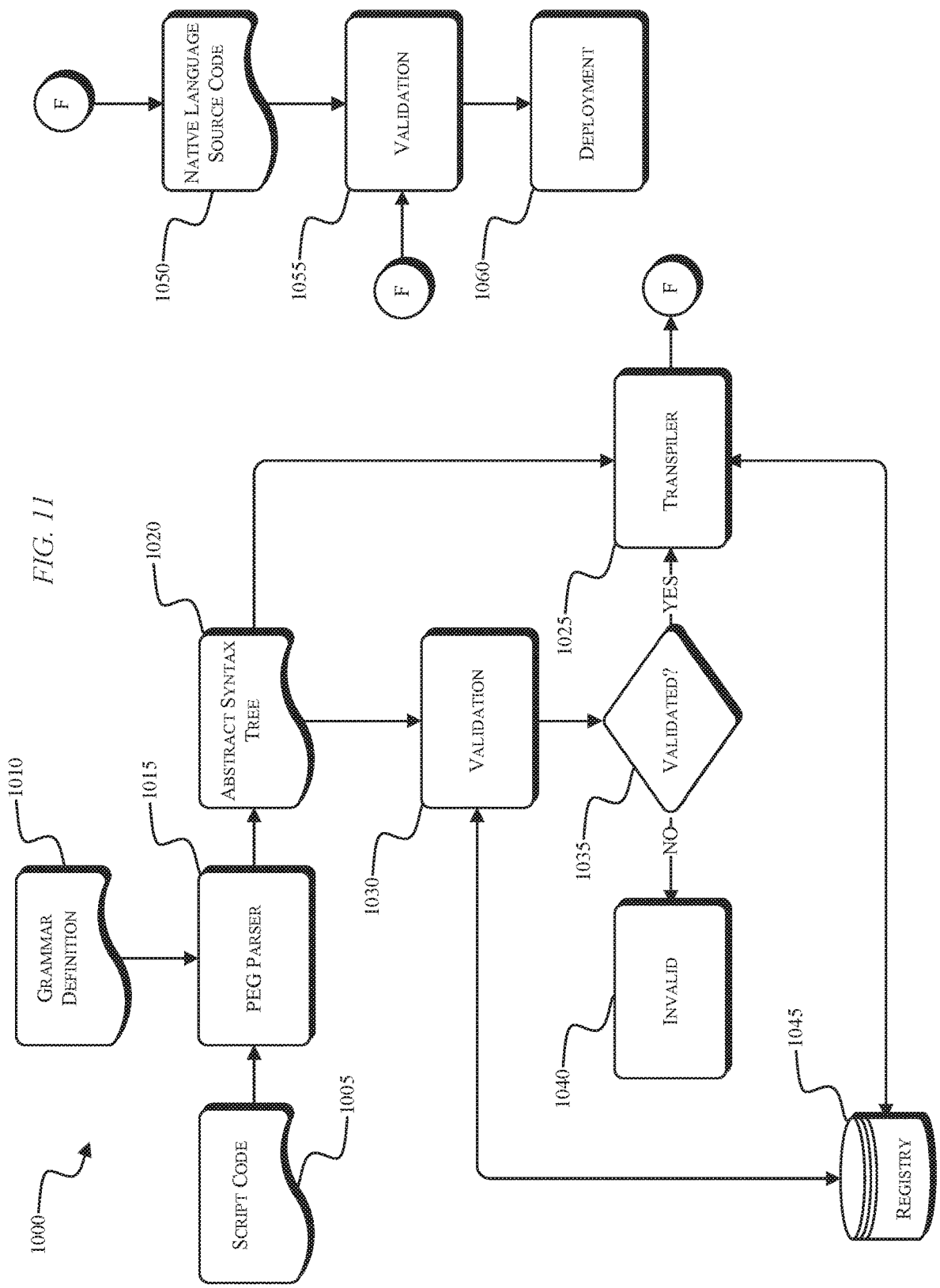
FIG. 11 illustrates a functional system diagram for transpiling fraud detection rules into native language source code, according to embodiments described herein.

A transpilation process 1000 for converting Script code into native language source code is illustrated in FIG. 11 as a functional block diagram of the system 100. The transpilation process 1000 begins with Script code (e.g., rules and policies) being provided to a PEG parser (STEP 1005). Grammar definitions for the Script code are also provided to the PEG parser (STEP 1010). At STEP 1015, the PEG parser uses the rules and syntax of a defined grammar to analyze and recognize the Script language code. The PEG parser then generates a representation of the Script language code using an abstract syntax tree (STEP 1020) to determine whether the syntax of the Script rules and policies is valid. By deconstructing the Script language and generating an abstract syntax tree, the system 100 is able to determine if the Script code is syntactically sound before transpiling the Script code to a native language source code.

Figure 12:
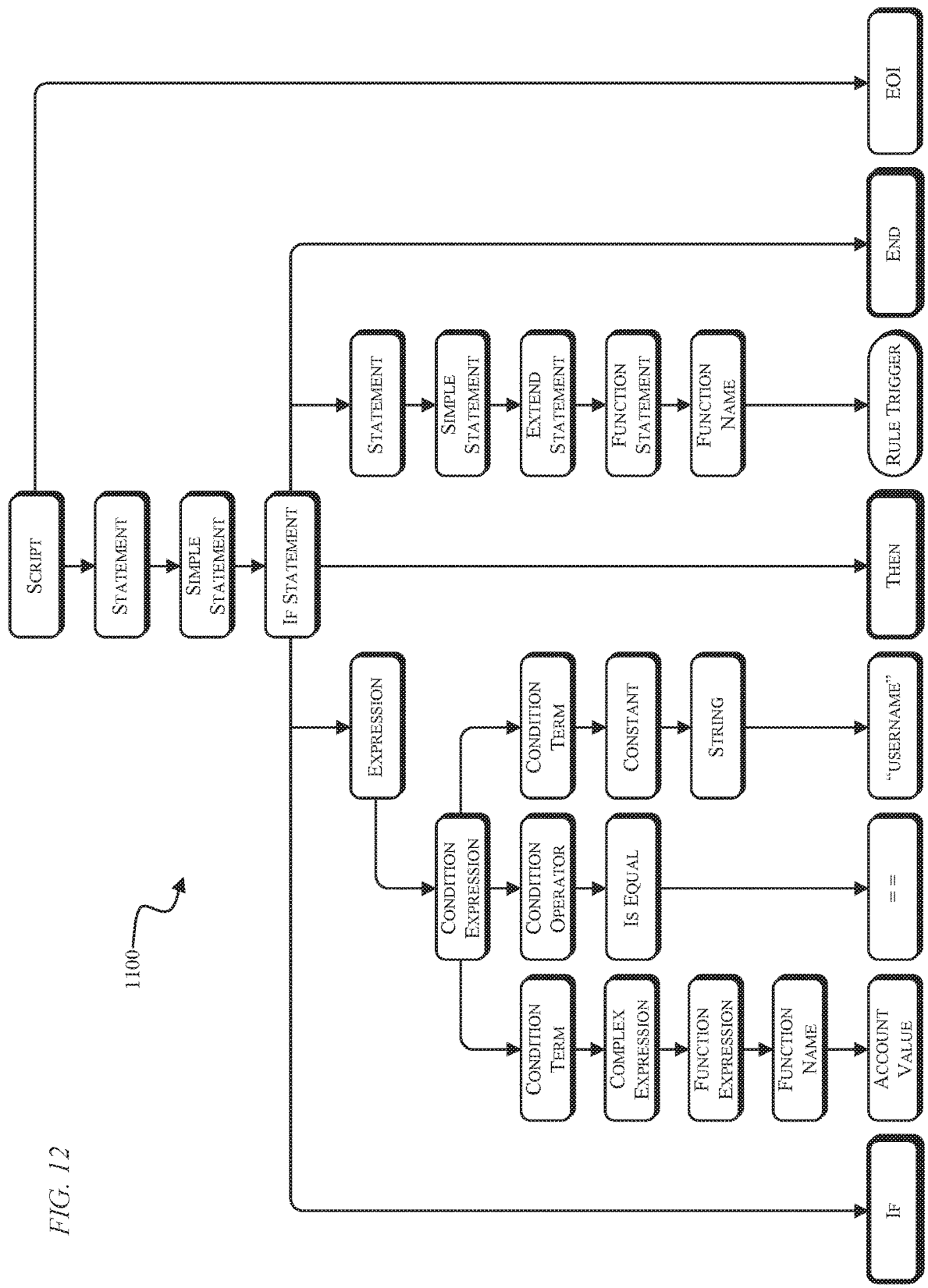
FIG. 12 illustrates an abstract syntax tree for a fraud detection rule, according to embodiments described herein.

An abstract syntax tree 1100 for the below basic Script rule is illustrated in FIG. 12.

```
if    Account.value = = "username" then
         RULE.TRIGGER
end
```

As illustrated in FIG. 12, the bottom tokens completely represent the actual Script rule. At each level of the grammar token, a nested grammar token or a predefined language constant (e.g., IF, THEN, END) can be represented either directly or recursively until the final Script language token can be mapped. Each Script language token can be mapped back to its parent grammar token and traced upwards to its root ancestor.

Figure 13:
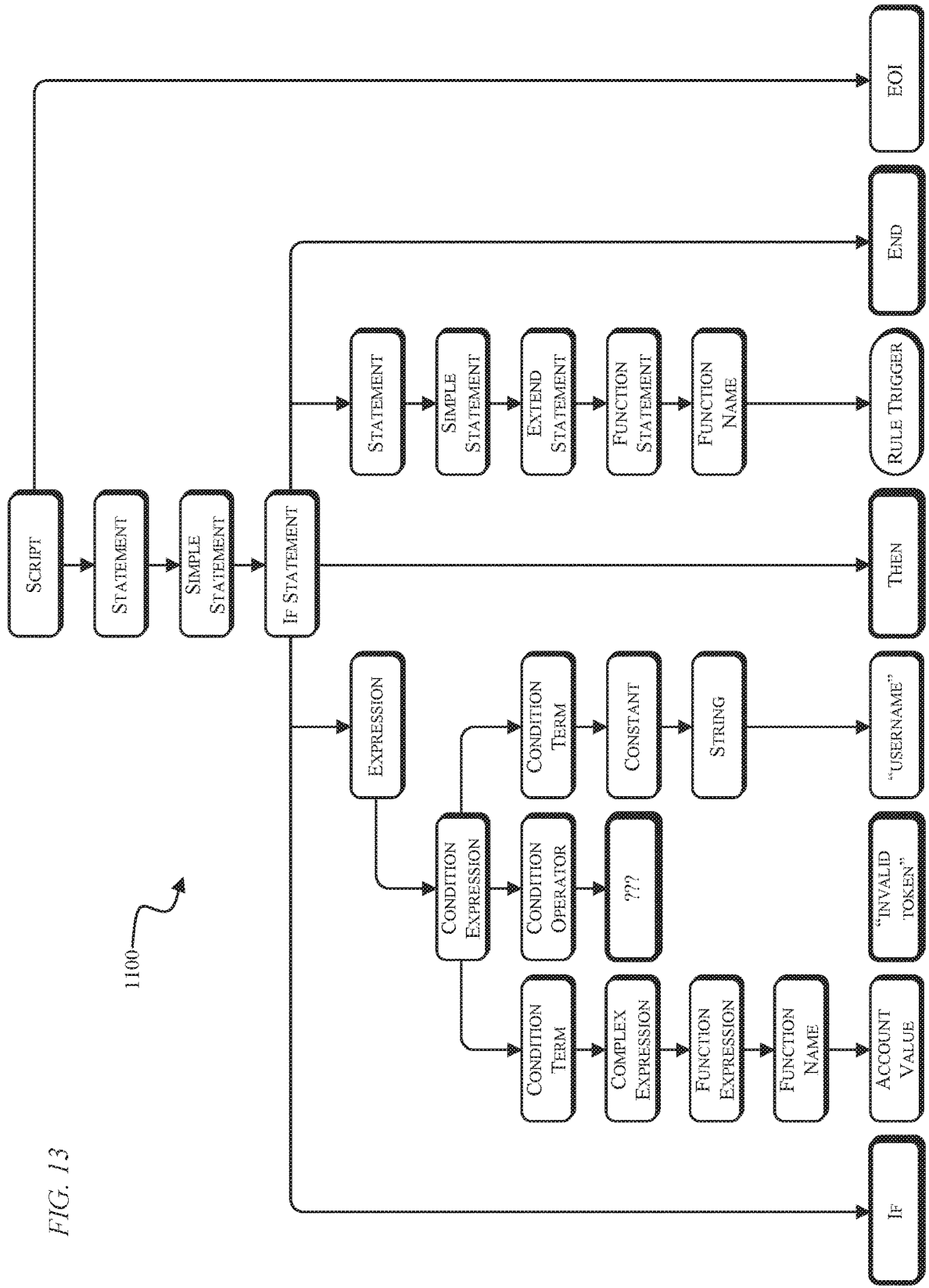
FIG. 13 illustrates an abstract syntax tree for a fraud detection rule, according to embodiments described herein.

The abstract syntax tree 1100 for the below basic Script rule is illustrated in FIG. 13.

```
if    Account.value "invalid token" "username" then
         RULE.TRIGGER
end
```

The abstract syntax tree 1100 of FIG. 13 is an example of when the PEG parser is unable to parse an invalid Script code rule. The above rule is invalid because there is an additional string in between the expression function name and the string value. The PEG parser is unable to validate the Script rule. When the CONDITION OPERATOR token attempts to match a value from the definition of a CONDITION EXPRESSION, the PEG parser is unable to find a suitable mapping since a CONSTANT STRING is the only available language token.

With reference to FIG. 11, the system 100 uses the abstract syntax trees to validate the Script code (STEP 1030). If, at STEP 1035, the validation was not successful, the Script code is flagged is invalid (STEP 1040) and the Script code will need to be debugged. If validation was successful, the parsed Script code is provided to the transpiler for transformation into the native language (STEP 1025).

The transpiler uses the abstract syntax tree generated by the PEG parser to convert the parsed Script code into native language source code. The abstract syntax tree includes the data path dependencies and associated meta data for the data points used in the Script code. In some embodiments, the meta data for each data point can be provided to a registry (STEP 1045). The meta data contains references to the data paths for initializing each data point to an actual value during run time (see FIG. 10).

The transpiler iterates through the abstract syntax tree for each rule and inserts the data point initialization code into the Script compiled code to optimize real-time execution. The transpiler collects all of the abstract syntax trees for all of the rules, policies, Add-On modifiers, event handlers, functions, etc., and transforms them into native language source code (e.g., PHP, Java, etc.). If an error occurs during transformation, the transpiler can report back exception details for invalid Script syntax or tokens, code line number, and token position to assist debugging.

Figure 14:
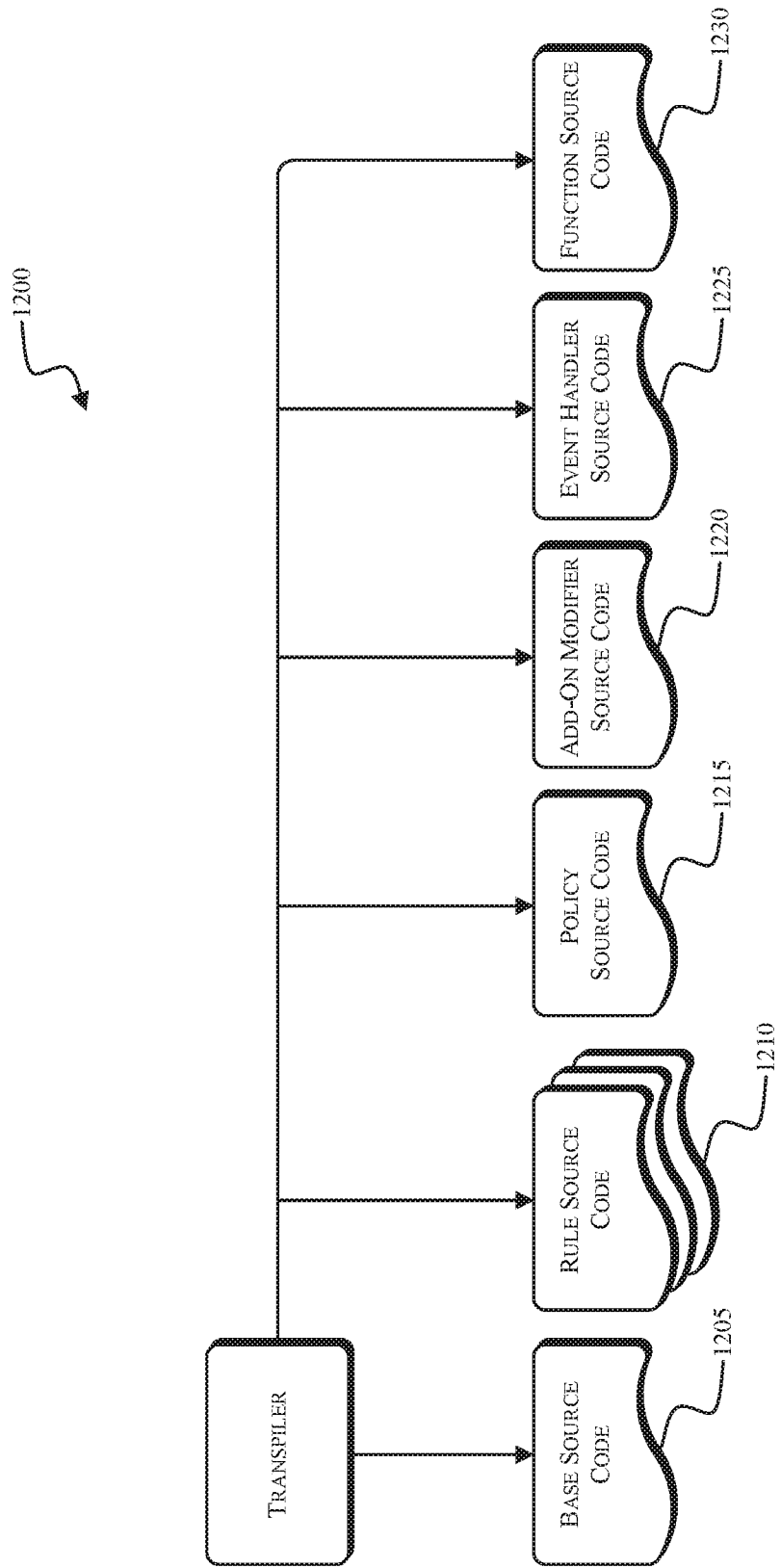
FIG. 14 illustrates the transpilation of fraud detection rules into a native language source code, according to embodiments described herein.

The transpiler is configured to generate a variety of output files that can be stored in the database 145. For example, as illustrated in FIG. 14, an output 1200 of the transpiler includes base source code 1205, rule source code 1210, policy source code 1215, Add-On modifier source code 1220, event handler source code 1225, and function source code 1230. The base source code 1205 connects all generated Script files by permitting access to shared functions and variables (e.g., data points from external systems, common function calls, generated function calls, etc.). The rule source code 1210 includes the fraud detection rules. Each rules file can be executed and scored based on the placement described in the associated meta data. In some embodiments, multiple files can be generated on a per placement basis. The policy source code 1215 includes the fraud detection policies. In some embodiments, a single policy file is generated and executed for all placements. The Add-On modifier source code 1220 includes, for example, the counters. All of the source code is capable of using Add-On modifiers. The event handler source code 1225 includes events and allow for modifications at various points of the risk scoring process. The function source code 1230 includes custom defined functions that allow for refactoring based on repetitive code blocks.

Figure 15:
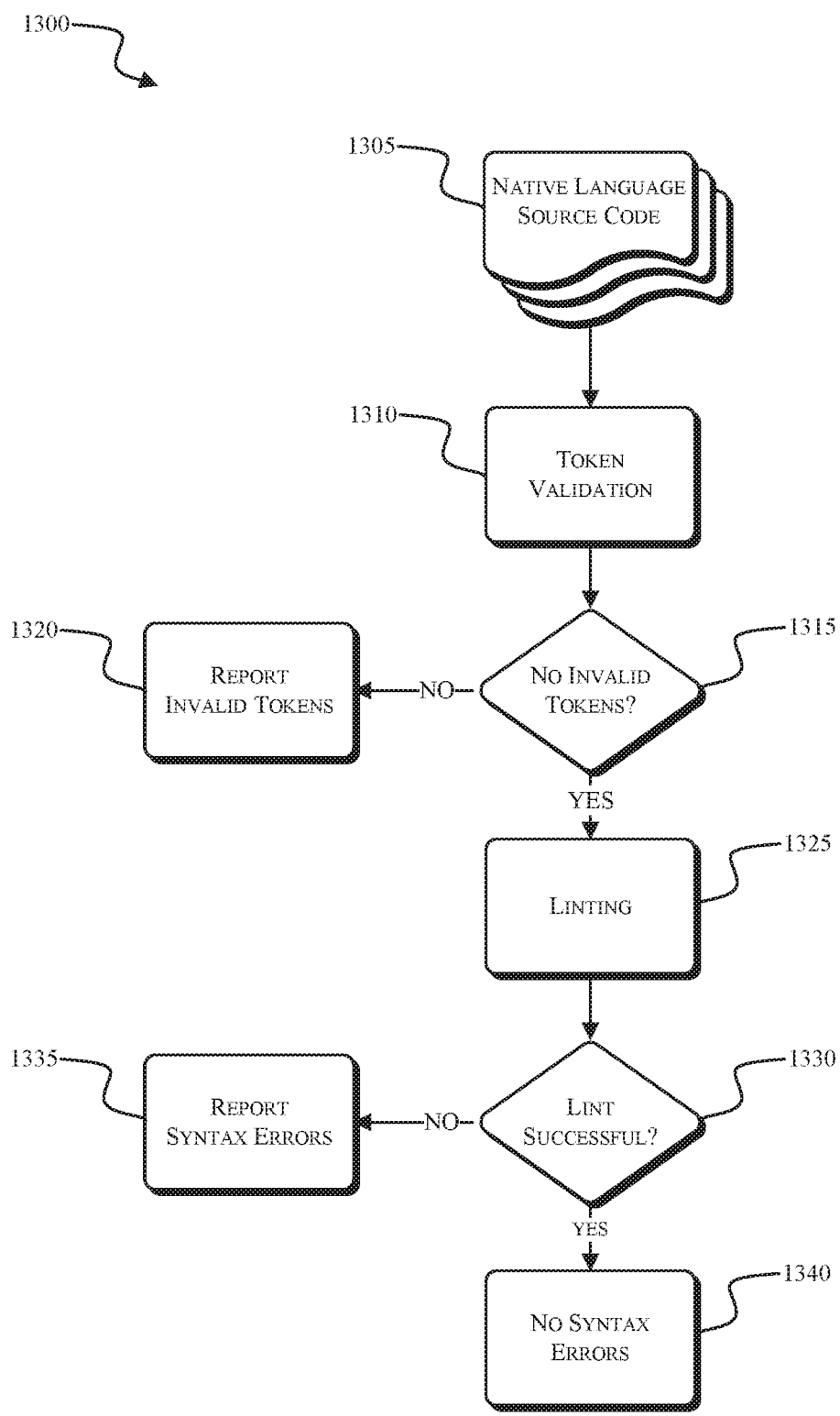
FIG. 15 illustrates a verification process for transpiled fraud detection rules, according to embodiments described herein.

With reference to FIG. 11, the transpiler outputs the native language source code (STEP 1050), the native language source code is validated (STEP 1055) before ultimately being deployed (STEP 1060). The validation of the native language source code is illustrated with respect to a process 1300 illustrated in FIG. 15. Two phases of validation are performed to ensure that the native language source code executes as expected. Validation is performed to verify that there are no syntactic errors and no missing tokens or constructs. This allows the system 100 to restrict the capability of the generated source code to only performing logic within the scope of scoring requests. The process 1300 begins with gathering the native language source code to be validated (STEP 1305). The first phase of validation is a token validation (STEP 1310). A list of permitted tokens in the native language source code can be produced and validated. The list of permitted tokens is validated with respect to all or a segment of the native language source code. If any extraneous or invalid tokens are detected (STEP 1315), the invalid tokens are reported (STEP 1320). If there are no invalid tokens, the process 1300 proceeds to phase two of validation where the native language source code is linted to verify there are no syntax errors (STEP 1325). In some embodiments, linting is optimized by performing inline linting on smaller segments of generated source code while temporary files are created (and deleted post linting) for larger segments of generated source code. If the lint was unsuccessful, the syntax errors are reported for debugging (STEP 1335). If the lint was successful, no syntax errors were found (STEP 1340) and the native language source code is ready for deployment.

When the rules and policies are deployed, they can be deployed in a disabled mode, an enabled mode, or a preview mode. The disabled mode is the default mode for a rule or policy. When disabled, the rule is not executed in real-time scoring and does not contribute to risk scoring. When enabled, the rule is executed in real-time scoring and any score changes apply to the risk score, risk score band (e.g., green, yellow, red), and can be added to a triggered rule list. The preview mode allows rules to be executed in real-time scoring, but any score changes do not apply to the risk score, risk score band, or triggered rule list. Preview mode risk scores, score bands, and triggered rule lists are, for example, only visible through the dashboard of the system 100.

Real-Time Execution

The rules converted into the native language source code (e.g., PHP, Java, etc.) are executed by, for example, the fraud detection module 320 after receiving a fraud score request through the fraud detection API 325. Real-time scoring is optimized to only load the data objects API Add-Ons that are specifically referenced in the rules associated with a given website. As a result, the system 100 has access to tens of thousands of metrics without having to load all data points in the real-time execution of the rules. After all fraud detection rules have been executed by the fraud detection module 320 and a fraud risk score has been generated, the fraud detection module provides or transmits the evaluation results to a customer through the fraud detection API along with an action (e.g., permit transaction, deny transaction, etc.). Because the fraud detection rules are executed in native language source code (e.g., PHP, Java, etc.) for the fraud detection module 320, the fastest possible execution of the fraud detection rules can be achieved. In some embodiments, the system 100 is able to execute thousands of rules in only approximately 100-200 milliseconds.

The dashboard accessible through the workstation 150 allows a system 100 user or fraud analyst to generate new rules and policies or update existing rules and policies in real-time. As illustrated in FIG. 3, the Script compiler 310 includes a real-time engine that enables new or update rules and policies to be deployed while the fraud detection module 320 is operating. The new or updated rules and policies are generated and optimized as described above.

Thus, embodiments described herein provide systems, methods, devices, and computer readable media for implementing fraud detection rules. Various features and advantages are set forth in the following claims.

What is claimed is:

1. A fraud detection system comprising:
a database; and
a server including a processing unit and a memory, the server connected to the database and configured to:
generate a first fraud detection rule and a second fraud detection rule based on data points or data objects,
wherein the first fraud detection rule includes a first Anchor attribute and a first Add-On identifier, the first Anchor attribute and the first Add-On identifier corresponding to a first data path for retrieval of a first value related to the first Add-On identifier,
wherein the second fraud detection rule includes a second Anchor attribute and a second Add-On identifier, the second Anchor attribute and the second Add-On identifier corresponding to a second data path for retrieval of a second value related to the second Add-On identifier, the second value being dependent on the first value,
transpile the first fraud detection rule and the second fraud detection rule into a first native fraud detection rule and a second native fraud detection rule that are in a native language source code compared to a scripting language code of the first fraud detection rule and the second fraud detection rule, the native language source code and the scripting language code having a level of code abstraction, and the native language source code having a faster compilation by the processing unit to a lower-level code relative to the scripting language code,
control the database to store the first data path, the second data path, the first native fraud detection rule, and the second native fraud detection rule,
receive a request for a fraud risk determination from a client server, the request associated with a requested action,
retrieve the first data path, the second data path, the first native fraud detection rule, and the second native fraud detection rule in response to receiving the request for the fraud risk determination from the client server,
retrieve the first value using the first data path and the second value using the second data path and based on the dependency on the first value, retrieval of the first value using the first data path being prioritized over retrieval of the second value using the second data path,
execute the first native fraud detection rule,
execute the second native fraud detection rule,
generate a fraud risk score related to the requested action based on the executed first native fraud detection rule and the executed second native fraud detection rule, and
transmit the fraud risk score to the client server to cause permission or denial of the requested action,
wherein an execution of the first native fraud detection rule and the second native fraud detection rule by the processing unit is faster than an execution of the first fraud detection rule and the second fraud detection rule by the processing unit.

2. The fraud detection system of claim 1, wherein:
a value for the first Anchor attribute is determined based on the request; and
a value for the second Anchor attribute is determined based on the request.

3. The fraud detection system of claim 1, wherein the server is further configured to:
generate a first callable object that includes the first data path; and
generate a second callable object that includes the second data path.

4. The fraud detection system of claim 3, wherein:
the first value is retrieved from a first data source using the first data path; and
the second value is retrieved from a second data source using the second data path.

5. The fraud detection system of claim 4, wherein the server is further configured to:
populate the first callable object with the first value; and
populate the second callable object with the second value.

6. The fraud detection system of claim 1, wherein:
the first Anchor attribute corresponds to a first token; and
the first Add-On identifier corresponds to a second token.

7. The fraud detection system of claim 6, wherein the first data path is a dot-separated, alphanumeric string that includes the first token and the second token.

8. A computer-implemented fraud detection method, the method comprising:
generating, with an electronic processor, a first fraud detection rule and a second fraud detection rule based on data points or data objects,
wherein the first fraud detection rule includes a first Anchor attribute and a first Add-On identifier, the first Anchor attribute and the first Add-On identifier corresponding to a first data path for retrieval of a first value related to the first Add-On identifier,
wherein the second fraud detection rule includes a second Anchor attribute and a second Add-On identifier, the second Anchor attribute and the second Add-On identifier corresponding to a second data path for retrieval of a second value related to the second Add-On identifier, the second value being dependent on the first value;
transpiling, with the electronic processor, the first fraud detection rule and the second fraud detection rule into a first native fraud detection rule and a second native fraud detection rule that are in a native language source code compared to a scripting language code of the first fraud detection rule and the second fraud detection rule, the native language source code and the scripting language code having a level of code abstraction, and the native language source code having a faster compilation by the processing unit to a lower-level code relative to the scripting language code;

receiving, with the electronic processor, a request for a fraud risk determination from a client server, the request associated with a requested action;

retrieving, with the electronic processor, the first data path, the second data path, the first native fraud detection rule, and the second native fraud detection rule in response to receiving the request for the fraud risk determination from the client server;

retrieving, with the electronic processor, the first value using the first data path and the second value using the second data path and based on the dependency on the first value, retrieving the first value using the first data path being prioritized over retrieving the second value using the second data path;

executing, with the electronic processor, the first native fraud detection rule;

executing, with the electronic processor, the second native fraud detection rule;

generating, with the electronic processor, a fraud risk score related to the requested action based on the executing of the first native fraud detection rule and the second native fraud detection rule; and transmitting, with the electronic processor, the fraud risk score to the client server to cause permission or denial of the requested action, wherein the execution of the first native fraud detection rule and the second native fraud detection rule is faster than an execution of the first fraud detection rule and the second fraud detection rule.

9. The method of claim 8, further comprising:
determining, with the electronic processor, a value for the first Anchor attribute based on the request; and
determining, with the electronic processor, a value for the second Anchor attribute based on the request.

10. The method of claim 8, further comprising:
generating, with the electronic processor, a first callable object that includes the first data path; and
generating, with the electronic processor, a second callable object that includes the second data path.

11. The method of claim 10, wherein:
the first value is retrieved from a first data source using the first data path; and
the second value is retrieved from a second data source using the second data path.

12. The method of claim 11, further comprising:
populating, with the electronic processor, the first callable object with the first value; and
populating, with the electronic processor, the second callable object with the second value.

13. The method of claim 8, wherein:
the first Anchor attribute corresponds to a first token; and
the first Add-On identifier corresponds to a second token.

14. The method of claim 13, wherein the first data path is a dot-separated, alphanumeric string that includes the first token and the second token.

15. A non-transitory computer readable medium including computer executable instructions stored in the non-transitory computer readable medium for controlling a device to:

generating a first fraud detection rule and a second fraud detection rule based on data points or data objects, wherein the first fraud detection rule includes a first Anchor attribute and a first Add-On identifier, the first Anchor attribute and the first Add-On identifier corresponding to a first data path for retrieval of a first value related to the first Add-On identifier, wherein the second fraud detection rule includes a second Anchor attribute and a second Add-On identifier, the second Anchor attribute and the second Add-On identifier corresponding to a second data path for retrieval of a second value related to the second Add-On identifier, the second value being dependent on the first value;

transpiling the first fraud detection rule and the second fraud detection rule into a first native fraud detection rule and a second native fraud detection rule that are in a native language source code compared to a scripting language code of the first fraud detection rule and the second fraud detection rule, the native language source code and the scripting language code having a level of code abstraction, and the native language source code having a faster compilation by the processing unit to a lower-level code relative to the scripting language code;

receiving a request for a fraud risk determination from a client server, the request associated with a requested action;

retrieving the first data path, the second data path, the first native fraud detection rule, and the second native fraud detection rule in response to receiving the request for the fraud risk determination from the client server;

retrieving the first value using the first data path and the second value using the second data path and based on the dependency on the first value, retrieval of the first value using the first data path being prioritized over retrieval of the second value using the second data path;

executing the first native fraud detection rule;
executing the second native fraud detection rule;

generating a fraud risk score related to the requested action based on the executed first native fraud detection rule and the executed second native fraud detection rule; and transmitting the fraud risk score to the client server to cause permission or denial of the requested action, wherein the execution of the first native fraud detection rule and the second native fraud detection rule is faster than an execution of the first fraud detection rule and the second fraud detection rule.

16. The non-transitory computer readable medium of claim 15, wherein:
a value for the first Anchor attribute is determined based on the request; and
a value for the second Anchor attribute is determined based on the request.

17. The non-transitory computer readable medium of claim 15, further including computer executable instructions stored in the non-transitory computer readable medium for controlling the device to:
generate a first callable object that includes the first data path; and
generate a second callable object that includes the second data path.

18. The non-transitory computer readable medium of claim 17, wherein:
the first value is retrieved from a first data source using the first data path; and the second value is retrieved from a second data source using the second data path.

19. The non-transitory computer readable medium of claim 18, further including computer executable instructions stored in the non-transitory computer readable medium for controlling the device to:
   populate the first callable object with the first value; and
   populate the second callable object with the second value.

20. The non-transitory computer readable medium of claim 15, wherein the first data path is a dot-separated, alphanumeric string that includes a first token that corresponds the first Anchor attribute and a second token that corresponds to the first Add-On identifier.

21. The fraud detection system of claim 1, wherein the server is further configured to:
   execute a thousand or more native fraud detection rules that are in the native language source code, the thousand or more native fraud detection rules including the first native fraud detection rule and the second native fraud detection rule,
   wherein the execution of the thousand or more native fraud detection rules occurs in approximately 100 to 300 milliseconds.

* * * * *